(12) United States Patent
Bharrat et al.

(10) Patent No.: US 12,015,737 B2
(45) Date of Patent: Jun. 18, 2024

(54) METHODS, SYSTEMS AND APPARATUS FOR GENERATING AND/OR USING COMMUNICATIONS TRAINING DATA

(71) Applicant: Ribbon Communications Operating Company, Inc., Westford, MA (US)

(72) Inventors: Shaun Jaikarran Bharrat, Edison, NJ (US); Michael Stovenour, McKinney, TX (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 17/848,231

(22) Filed: Jun. 23, 2022

(65) Prior Publication Data

US 2023/0388414 A1  Nov. 30, 2023

Related U.S. Application Data

(60) Provisional application No. 63/347,016, filed on May 30, 2022.

(51) Int. Cl.
  *H04M 3/436* (2006.01)
  *G06N 20/00* (2019.01)
(52) U.S. Cl.
  CPC ............ *H04M 3/436* (2013.01); *G06N 20/00* (2019.01)
(58) Field of Classification Search
  None
  See application file for complete search history.

(56) References Cited

U.S. PATENT DOCUMENTS 9,762,731 B1 *  9/2017  Cohen ................. H04M 3/4365
10,666,792 B1    5/2020  Marzuoli et al.
(Continued)

FOREIGN PATENT DOCUMENTS

| CN | 110602303 A | 12/2019 |
| EP | 3324607 A1 | 5/2018 |
| GB | 2455505 A | 6/2009 |

OTHER PUBLICATIONS

Richard Harter, The minimum on a sliding window algorithm, downloaded from Internet address http://richardhartersworld.com/slidingmin/ on Aug. 5, 2022, 4 pages.
(Continued)

*Primary Examiner* — Harry S Hong
(74) *Attorney, Agent, or Firm* — Straub & Straub; Stephen T. Straub; Michael P. Straub

(57) ABSTRACT

The present invention relates to methods, systems, and apparatus for generating and/or using training data. An exemplary embodiment includes the steps of: generating from a first plurality of communications a first set of media fingerprints and corresponding communications information, the media fingerprints included in the first set of media fingerprints and corresponding communications information being a first set of media fingerprints; generating from a second plurality of communications a set of media fingerprints of a first type, each individual communication of the second plurality of communications having characteristics indicating a probability greater than a first threshold that the individual communication is of the first type; labeling individual media fingerprints in the first set of media fingerprints and corresponding communications information as being of the first type when the individual media fingerprint being labeled matches a media fingerprint in the set of media fingerprints of the first type.

25 Claims, 16 Drawing Sheets

(56) References Cited

U.S. PATENT DOCUMENTS

| | | | |
|---|---|---|---|
| 10,798,241 | B1 | 10/2020 | Quilici et al. |
| 11,343,374 | B1* | 5/2022 | Rolia .................. H04M 3/36 |
| 2003/0176934 | A1 | 9/2003 | Gopalan et al. |
| 2006/0143190 | A1 | 6/2006 | Haitsma et al. |
| 2007/0192390 | A1 | 8/2007 | Wang et al. |
| 2008/0178288 | A1* | 7/2008 | Alperovitch .......... H04L 51/212 |
| | | | 726/22 |
| 2011/0173208 | A1 | 7/2011 | Vogel |
| 2012/0215853 | A1* | 8/2012 | Sundaram ............. H04L 51/212 |
| | | | 709/206 |
| 2013/0259211 | A1 | 10/2013 | Vlack et al. |
| 2018/0007199 | A1* | 1/2018 | Quilici .............. H04M 3/42153 |
| 2018/0294959 | A1 | 10/2018 | Traynor et al. |
| 2020/0257722 | A1 | 8/2020 | Zhang et al. |
| 2021/0092223 | A1* | 3/2021 | Gallagher ........... H04M 3/2281 |
| 2021/0136200 | A1 | 5/2021 | Li et al. |
| 2022/0086175 | A1 | 3/2022 | Bharrat et al. |
| 2022/0247866 | A1* | 8/2022 | Xiao-Devins ......... H04M 3/436 |
| 2022/0270017 | A1 | 8/2022 | Singh et al. |
| 2022/0399945 | A1 | 12/2022 | Frenkel et al. |
| 2023/0386484 | A1 | 11/2023 | Jangi et al. |

OTHER PUBLICATIONS scipy.ndimage.maximum_filter, SciPy.org, SciPy v1.9.0 Manual, downloaded from Internet address https://docs.scipy.org/doc/scipy/reference/generated/scipy.ndimage.maximum_filter.html on Aug. 5, 2022, 3 pages.

scipy.ndimage.maximum_filter1d, SciPy.org, SciPy v1.9.0 Manual, downloaded from Internet address https://docs.scipy.org/doc/scipy/reference/generated/scipy.ndimage.maximum_filter1d.html on Aug. 5, 2022, 3 pages.

scipy.ndimage.filters.maximum_filter, SciPy.org, SciPy v0.14.0 Reference Guide, downloaded from Internet address https://docs.scipy.org/doc/scipy-0.14.0/reference/generated/scipy.ndimage.filters.maximum_filter.html on Aug. 5, 2022, 2 pages.

Multidimensional image processing, SciPy.org, SciPy v1.9.0 Manual, downloaded from Internet address https://docs.scipy.org/doc/scipy/tutorial/ndimage.html on Aug. 5, 2022, 27 pages.

Kim Hyoung-Gook et al., Robust audio fingerprinting using peak-pair-based hash of non-repeating foreground audio in a real. environment, Cluster Computing, Baltzer Science Publishers, Bussum, NL, vol. 19, No. 1, Jan. 2, 2016, pp. 315-323.

Notification of Transmittal of the International Search Report and the Written Opinion of the International Searching Authority, International Search Report and Written Opinion of the International Searching Authority from PCT/US2023/023725 dated Aug. 24, 2023 1-14 pages.

Multidimensional image processing, SciPy.org, SciPy v0.14.0 Reference Guide, downloaded from Internet address https://docs.scipy.org/doc/scipy-0.14.0/reference/tutorial/ndimage.html on Aug. 16, 2022, 28 pages.

Will Drevo, Audio Fingerprinting with Python and Numpy, Nov. 15, 2013, downloaded from Internet address https://willdrevo.com/fingerprinting-and-audio-recognition-with-python/ on Aug. 8, 2022, 15 pages.

* cited by examiner

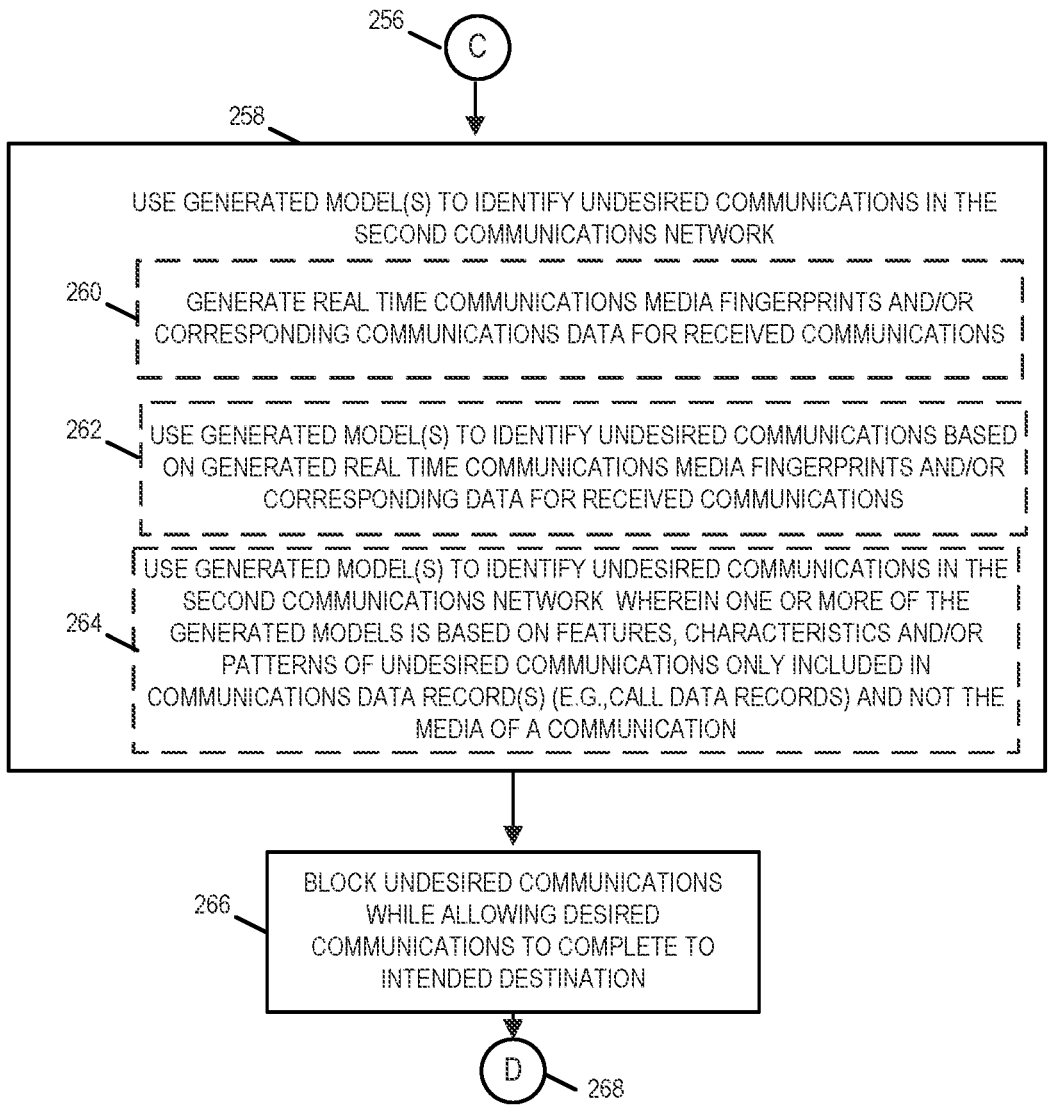

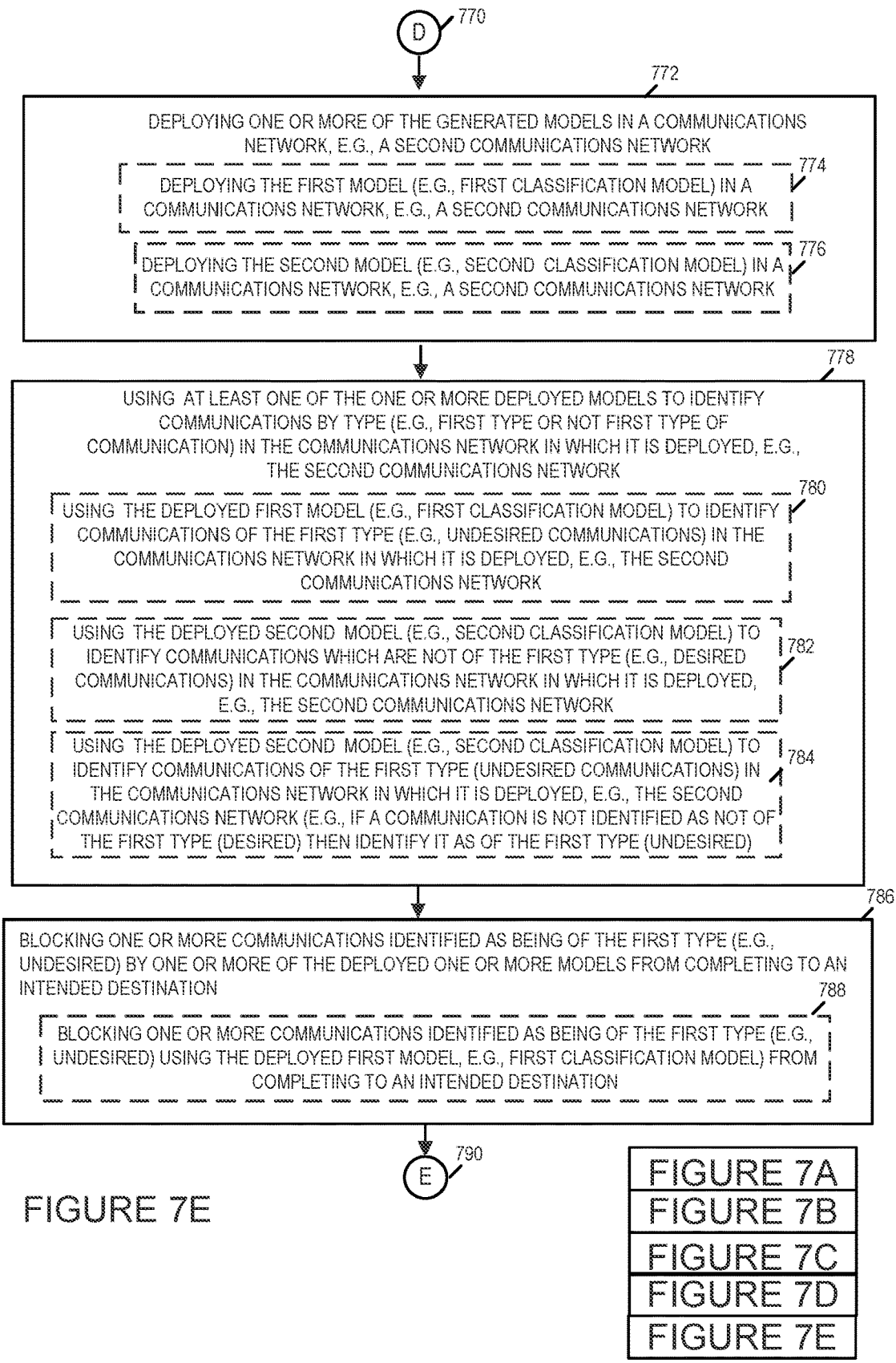

METHODS, SYSTEMS AND APPARATUS FOR GENERATING AND/OR USING COMMUNICATIONS TRAINING DATA

RELATED APPLICATIONS

The present application claims the benefit of U.S. Provisional Patent Application Ser. No. 63/347,016 which was filed on May 30, 2022 and which is hereby expressly incorporated by reference in its entirety.

FIELD OF INVENTION

The present invention relates to methods, systems and apparatus for generating and/or using communications training data, e.g., to build machine learning classification models.

BACKGROUND

The world is drowning in unsolicited communications such as robocalls. Generally, a robocall is a mass telephony communications method wherein calls are initiated by an automated system instead of a human caller. These calls are a nuisance to individual customers and a resource drain on businesses. Robocallers can include spammers and spoofers. Features related to detecting and blocking robocalls have long been sought by the customers and businesses which have been adversely affected by robocalls. In the United States alone, there were over 50 billion robocalls in 2021.

Various systems have been implemented in this space to provide robocall services such as, for example, services in which calls are assigned scores based on the presence of the calling party number appearing in various lists using some form of model inference, and then determining how the call is to be treated based on the assigned score. The complexity of inference models can vary, ranging from hand-tuned logistic regression models to full machine learning trained models. However, as the number of model features increases, and as the bad actors adapt their techniques more rapidly, the use of simpler modeling techniques becomes impractical.

The putative answer to almost any problem these days is to use "Machine Learning" or "Artificial Intelligence". While at a high level this is true of the robocalling problem, the devil is in the details. This is inherently a supervised learning problem, supervised learning being a machine learning task of learning a function that maps an input to an output based on example input-output pairs. To train a model in a supervised learning problem such as this one, one needs lots of *labeled* data. Creating this labeled data set has been the Achilles heel of applying machine learning to this problem.

There is a need for new and/or improved methods, systems, and apparatus for overcoming the technological problem of how to effectively and efficiently obtain and/or generate labeled data sets for use in training model(s) to determine whether communications, e.g., calls, SMS text messages, e-mails, etc., are of a first type, e.g., undesired communications such as, for example, robocalls. In addition, there is a need for new and/or improved methods, system, and apparatus for overcoming the technological problem of obtaining and/or generating labeled training data sets for use in performing supervised learning to generate communications model(s) which may be used to determine how a communication is treated. There is a further need for a solution to overcome the technical problem of how and what policies to apply to communications detected and/or classified as being of a first type, e.g., actual or suspected robocalls, in an effective and efficient manner. There is a further need for new and/or improved methods, systems, and apparatus for solving the technical problem of how to generate artificial intelligence model(s) using supervised machine learning and then utilize those model(s) to detect and/or classify communications in real-time, for example as undesirable communications, e.g., robocalls.

SUMMARY

The present invention relates to methods, systems and apparatus for generating and/or using communications training data, e.g., to build machine learning classification models. One or more embodiments of the present invention addresses one or more of the various technical problems described above.

An exemplary method of processing communications (e.g., calls, SMS messages, e-mails) in accordance with an embodiment of the present invention includes the steps of: generating from a first plurality of communications passing through a first communications network a first set of communications media fingerprints and corresponding communications information, said communications media fingerprints included in said first set of communications media fingerprints and corresponding communications information being a first set of communications media fingerprints; generating from a second plurality of communications a set of communications media fingerprints of a first type, said set of communications media fingerprints of a first type being a second set of communications media fingerprints, each individual communication of said second plurality of communications having characteristics indicating a probability greater than a first threshold that the individual communication is of said first type; labeling individual communications media fingerprints in said first set of communications media fingerprints and corresponding communications information, said step of labeling including labeling communications media fingerprints in said first set of communications media fingerprints and corresponding communications information as being of said first type when the individual communications media fingerprint being labeled matches a communications media fingerprint in said set of communications media fingerprints of said first type.

In some embodiments, each entry in the first set of communications media fingerprints and corresponding communications information includes a communications media fingerprint and corresponding communication information for an individual communication.

In some embodiments, each entry in the first set of communications media fingerprints and corresponding information is stored in a record.

In some embodiments, the communications information for an individual communication includes one or more of the following: communication source identifier, communication destination identifier, communication source IP address, communication destination IP address, communication start time, communication completion or termination time, media type (audio call, video call, audio/video call, e-mail, text message, SMS message), SIP-User-Agent content, Via header content and format, ingress trunk group, egress trunk group, geographical location information for origin of communication, geographical destination information for destination of communication, area code and/or country code of origin of communication, area code and/or country code of destination of communication, etc.

In some embodiments, the first plurality of communications are telephone calls. In some such embodiments, the second plurality of communications are telephone calls. In some embodiments, the first type is an undesired communication (e.g., a robocall); and the characteristics indicating a probability greater than a first threshold that the individual communication is of said first type include: (i) the communication is a telephone call, and (ii) that the communication is directed to an unused destination telephone number.

In some embodiments, the method further includes the step of operating a communications capture system (e.g., honeypot) that captures communications having characteristics indicating a probability greater than a first threshold (e.g., a high probability such as 90%) that the individual communication is of said first type.

In some embodiments, the step of generating from a first plurality of communications passing through a first communications network a first set of communications media fingerprints and corresponding communications information (e.g., CDR information) includes: generating, at a first fingerprinting device, said first set of communications media fingerprints. In some embodiments, the first fingerprinting device is a communications processing device. In some embodiments the first fingerprinting device is a Session Border Controller (SBC).

In some embodiments, the step of generating from a first plurality of communications passing through a first communications network a first set of communications media fingerprints and corresponding communications information (e.g., CDR information) includes: associating individual communications media fingerprints in said first set of communications media fingerprints with corresponding communications information (e.g., each entry or record in the first set of communications media fingerprints and corresponding information including a communications media fingerprint and corresponding CDR information for the communication to which the communications media fingerprint corresponds where the CDR information is from a first set of communications data records).

In some embodiments, the method further includes the step of: generating communications data records (e.g., CDRs) for communications passing through the first communications network, at least some of said communications data records corresponding to communications for which communications media fingerprints were generated by said first fingerprinting device.

In some embodiments, the communications data records include signaling information for individual communications and wherein generating the first set of communications media fingerprints and corresponding communications information includes associating individual call data records with corresponding communications media fingerprints to generate entries in said first set of communications media fingerprints and corresponding communications information, each entry including a communications media fingerprint and corresponding communications information from the communication to which the entry corresponds (e.g., in first set of communications media fingerprints and corresponding communications information record 1 includes the communications media fingerprint for communications 1 and corresponding communications data record information for communications 1; record 2 includes the communications media fingerprint for communications 2 and corresponding communications data record information for communications 2; and so on).

In some embodiments, the step of: generating from a second plurality of communications a set of communications media fingerprints of a first type includes: (i) generating media fingerprint locales for one or more of the communications media fingerprints of the second set of communications media fingerprints, each of said generated media fingerprint locales including a set of communications media fingerprints based on media from a single communication from the second plurality of communications.

In some embodiments, for communications with media which is audio said step of generating media fingerprint locales for one or more of the communications media fingerprints of the second set of communications media fingerprints includes: passing at least a first portion of an audio stream of a first communication from the second plurality of communications through different codecs as part of generating said media fingerprint locale for the first communications.

In some embodiments, the communications media fingerprints for media which is audio is based on frequency characteristics extracted from the audio using digital signal processing.

In some embodiments, the method further includes comparing individual communications media fingerprints in said first set of communications media fingerprints and corresponding communications information to communications media fingerprints in said set of communications media fingerprints of said first type to identify communications media fingerprints in said first set of communications media fingerprints and corresponding communications information that match a communications media fingerprint in said set of communications media fingerprints of said first type.

In some embodiments, the method further includes the step of: comparing (e.g., before said step of labeling) individual communications media fingerprints in said first set of communications media fingerprints and corresponding communications information to communications media fingerprints in said set of communications media fingerprints of said first type to identify communications media fingerprints in said first set of communications media fingerprints and corresponding communications information that match a communications media fingerprint (e.g., any individual one of the communications media fingerprints) in said set of communications media fingerprints of said first type.

In some embodiments, the match is an exact match or a fuzzy match.

In some embodiments, each of said communications which are included in said first plurality of communications is different than each of said communications which are included in said second plurality of communications (e.g., none of the communications, e.g., calls, which are included in the first plurality of communications are included in the second plurality of communications, e.g., because they are communications, e.g., calls, from non-overlapping time periods or different country regions).

In some embodiments, one or more of said communications which are included in said first plurality of communications is included in said second plurality of communications. In some embodiments, a first communication is included in said first plurality of communications and said second plurality of communications, said first communications being used to generate an entry in the first set of communications media fingerprints and an entry in the second set of communications media fingerprints.

In some embodiments, the step of labeling individual communications media fingerprints in said first set of communications media fingerprints includes labeling communications media fingerprints in said first set of communications media fingerprints and corresponding communications information as being not first type communications media fingerprints when the individual communications media fingerprint being labeled does not match a communications media fingerprint in said set of communications media fingerprints of the first type.

In some embodiments, the method further includes the steps of: selecting a balanced set of communications media fingerprints and corresponding communications information by: i) selecting some labeled first type communications media fingerprints and corresponding communications information, and ii) selecting some labeled not first type communications media fingerprints and corresponding communications information; and storing the selected balanced set of communications media fingerprints and corresponding communications information as a set of automatically generated and labeled training data including communications media fingerprints of both not first type (e.g., desired) communications and first type (e.g., undesired) communications.

In some embodiments, said first type is undesired; said not first type is desired; and the method further includes dividing, prior to selecting the balanced set of communications media fingerprints, communications media fingerprints and corresponding communications information into a labeled set of first type (e.g., undesired) communications media fingerprints and corresponding communications information and a labeled set of not first type (e.g., desired) communications media fingerprints and corresponding communications. In some such embodiments, the labeled set of first type communications media fingerprints and corresponding communications information is a labeled set of undesired communications media fingerprints and corresponding communications information; and the labeled set of not first type communications media fingerprints and corresponding communications is a labeled set of desired communications media fingerprints and corresponding communications.

In some embodiments, the step of selecting a balanced set of communications media fingerprints and corresponding communications information includes selecting equal or near equal numbers of communications media fingerprints and corresponding communications information from the labeled set of undesired communications media fingerprints and corresponding communications information and the labeled set of desired communications media fingerprints and corresponding communications.

In some embodiments, the labeled set of desired communications media fingerprints and corresponding communications information includes more records (e.g., 10 times or some other multiple) than the labeled set of undesired communications media fingerprints; and the balanced set of communications media fingerprints and corresponding communications information includes an equal or near equal number of records corresponding to desired communications and undesired communications.

In some embodiments, the method further includes the step of: performing one or more communications model training operations using said balanced set of communications media fingerprints and corresponding communications information as a labeled set of communications training data to generate one or more models used to distinguish between desired communications and undesired communications.

In some embodiments, the step of performing one or more classification model training operations includes generating at least a first communications model corresponding to an undesired communication.

In some embodiments, the first classification model is based on non-media features (e.g., signaling related features such as source address, source identifier, calling party name, calling party number, source identifier, calling party country of origin, time of day) included in said balanced set of communications media fingerprints and corresponding communications information.

In some embodiments, the first classification model is not based on features included in the media included in a communication and thus does not require the examination or use of communications media to determine whether a communication is an undesired communication.

In some embodiments, the step of performing one or more classification model training operations includes generating a second classification model corresponding to desired communications.

In some embodiments, the method further includes the steps of: deploying the generated first classification model in a second communications network; and using the deployed model to identify undesired communications in the communications network in which the model is deployed.

In some embodiments the step of using the first classification model to identify undesired communications in the second communications network in which the model is deployed is performed in real time before the media corresponding to the communications identified as undesired communications are delivered to a communications network user (e.g., individual to whom a call or Email communication is directed).

In some embodiments, the first communications network and said second communications network are different communications networks.

In some embodiments, the method further includes the step of: blocking one or more undesired communications identified using the deployed first classification model from completing to an intended destination.

The present invention is applicable to apparatus and system embodiments wherein one or more devices implement the steps of the method embodiments. In some apparatus embodiments the communications processing device, e.g., SBC, fingerprinting device, model(s) generator, training data set generator and each of the other apparatus/devices of the system include a processor and a memory, the memory including instructions that when executed by the processor control the apparatus/device of the system to operate to perform the steps of various method embodiments of the invention.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 comprises the combination of FIGS. 2A, 2B, 2C and 2D.

FIG. 2D illustrates a fourth part of a flowchart of an exemplary method in accordance with an embodiment of the present invention.

FIG. 7 comprises the combination of FIGS. 7A, 7B, 7C, 7D and 73.

FIG. 7E illustrates a fifth part of a flowchart of an exemplary method in accordance with an embodiment of the present invention.

DETAILED DESCRIPTION

The present invention utilizes procedures including media fingerprint matching of communications media to generate and automatically label training data sets for use in generating and training models to detect communications of a first type, e.g., robocalls or undesired communications. In some of the embodiments, the methodology described herein is applied to operations for constructing a training dataset for building a machine learning (ML) model for robocall classification.

Figure 1:
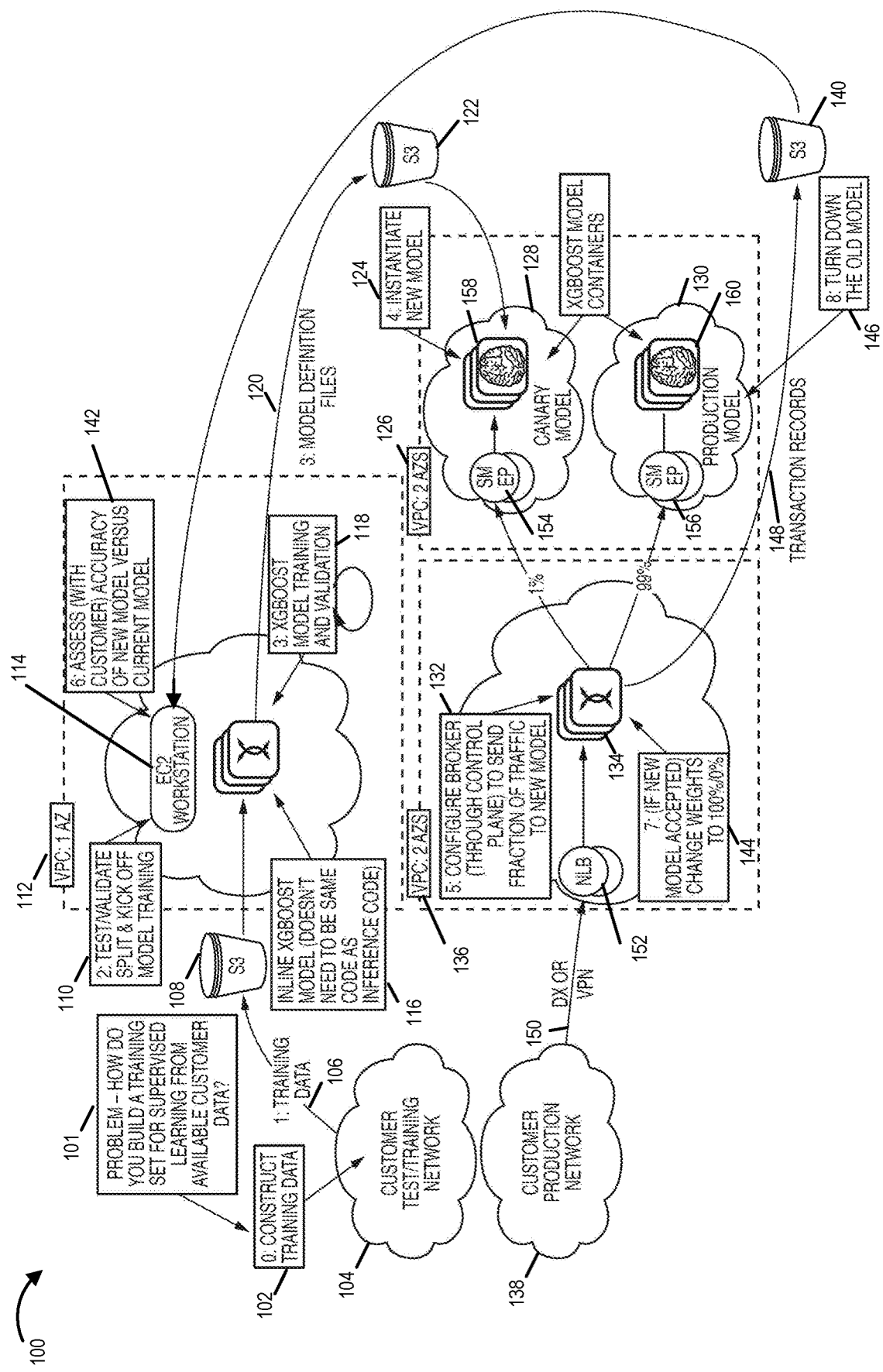
FIG. 1 illustrates an exemplary Machine Learning (ML) pipeline of training and deployment of new models within an IdHub infrastructure/system.

Diagram 100 of FIG. 1 illustrates an overall Machine Learning pipeline of training and deployment of new models within an IdHub infrastructure/system. The numbers 0, 1, 2, 3, 4, 5, 6, 7, and 8 in the diagram show the progression of steps of a method for training and deploying new models, e.g., classification models, in the IdHub infrastructure/system. As shown in the Machine Learning pipeline of training and deployment of new models shown in diagram 100 the starting point of the pipeline is the construction of training data in step 102. The training data is constructed in a customer test/training network 104. Operation proceeds from step 102 to step 106. In step 106 the constructed training data is stored in storage device 108, e.g., a database or cloud storage. Operation proceeds from step 106 to step 110. In step 110, model, e.g., classification model, testing/validation and kick off of model training is performed using the constructed training data, the operations of step 110 occurring in a Virtual Private Cloud 112 using a computing system/entity 114, EC2 workstation. The constructed training data and an inline XGBoost model 116 are input to the computing system/entity 114 in step 110. A XGBoost model is a decision-tree-based artificial intelligence Machine Learning algorithm that uses a gradient boosting framework. Operation proceeds from step 110 to step 118.

In step 118, the model training (e.g., XGBoost model training) and validation of the model occurs with the output being model definition files 120 being stored in database 122. Operation proceeds from step 118 to step 124. In step 124, a new model is instantiated. The new model is a canary model 128 in that it is for testing on a small set of actual traffic, e.g., communications or calls, e.g., 1% of the traffic, while the rest of the traffic (e.g., the other 99% in this example) is processed by a production model 130. In this example, the new instantiated model 128 referred to as the canary model and the production model 130 are included in a Virtual Private Cloud 126. Operation proceeds from step 124 to step 132.

In step 132, a broker 134 in Virtual Private Cloud 136 is configured (e.g., through the control plane) to send a fraction of the traffic to the new model 128 and the remaining traffic to the production model 130. The fraction in this example is $\frac{1}{100}^{th}$ or 1% of the traffic. As shown in the example, broker 134 communicates 1% of the traffic received from the customer production network 138 via dedicated network (DX) connection or a Virtual Private Network (VPN) connection 150 and network load balancer (NLB) 152 to the canary model 128 and the other 99% of the traffic received from the customer production network 138 to the production model 130 for processing, the canary model 128 including Sagemaker Endpoint (SM EP) 154 and the production model 130 including SM EP 156, the canary model 128 and production model 130 including XGBOOST MODEL CONTAINERS 158 and 160 respectively. The broker 134 also sends transaction records 148 to a storage device 140, e.g., a database. Operation proceeds from step 132 to step 142.

In step 142, the computing system 114 retrieves from database 140 the transaction records and assesses (with the customer) the accuracy of the new model 128 versus the current production model 130. Operation proceeds from step 142 to step 144. In step 144, if the new model 128 is accepted the weights in the broker 134 are changed so that 100% of the traffic received from the customer is directed to model 128 and 0% is directed to the production model 130. Operation proceeds from step 144 to step 146. In step 146, the old production model 146 is turned off or down as all traffic is now directed through model 128 which becomes the new production model.

As indicated in diagram 100 text box 101, the problematic part of the flow of the Machine Learning pipeline of training and deployment of new models is the creation of a viable training data set. In one embodiment of the present invention, to build this training data set communications data (e.g., call data) from a honeypot system, communications media signatures across communications, and communications data, (e.g., session border controller (SBC) call data records and trace records from one or more customer's network) are used when the communications are calls.

A description of the media signature for a communication, e.g., call, will now be discussed. In a VOIP infrastructure/system, the media of a call is a digital representation of the audio that lends itself to the domain of digital signal processing. From the audio, the frequency characteristics can be extracted into a "fingerprint" of the audio. This is similar to the audio fingerprinting that can, for example, match snippets of a song. However, audio in a call, e.g., a robocall, is more highly variable than a song and the fingerprinting algorithm needs additional robustness characteristics. Problematic additions include variable delay before the audio starts, intra-message delays, and the varying quality due to different codec types.

In some embodiments, a fingerprinting algorithm based on the Dejavu song matching service is utilized. First, as the audio streams in, it is segmented, with overlap between adjacent samples. A Discrete Fourier Transform (DFT) is then computed on each sample. The DFT points are then filtered, and some number of peaks identified. These tuples of peaks and their associated timing then form the basis of the communications media fingerprint, also referred to as a call media fingerprint when the communication is a call.

There are two critical characteristics inherent in the fingerprinting algorithm implemented in various embodiments of the present invention. First, this is a black box: the input is the audio stream, and the output is the communications media fingerprint. Second, the fingerprint is a non-invertible compression function on the media. This makes it impossible to reconstruct the media from the fingerprint. Taken together, these two characteristics ensure that this processing would not be considered a "telephone recording" by the Federal Communications Commission (FCC) or other governmental rules applicable to communications. This is critical to the practicality of the approach.

The purpose of a communications media fingerprint is to be able to check whether a media stream A is the "same" as media stream B without actually comparing the media streams. While how the fingerprint is computed has been described, how matching of fingerprints is performed has not. There is an associated comparison function which is utilized. Due both to the technology behind the fingerprinting and the use case here, a fuzzy match rather than an exact match is of interest. The matching algorithm or method here first expands the target fingerprint into a fingerprint "locale", a fingerprint locale being a set of fuzzy fingerprints based on the target fingerprint. The candidate fingerprint is then compared to all members of the locale and a match is declared if the candidate (exactly) matches anything in the locale. This fuzzy matching allows for correctly determining that two instances of a robo-campaign where the caller makes a small alteration (such as changing the name of a party) are in fact still a match. In some embodiments, a fingerprint locale or set of fuzzy fingerprints is generated for the communication, e.g., call, under test and compared to instances of robocall fingerprints.

In some embodiments, the communications media fingerprints are generated and matched, e.g., using fuzzy fingerprint matching, as described in the U.S. Provisional Patent Application Ser. No. 63/346,989 entitled, "METHODS AND APPARATUS FOR GENERATING AND/OR USING COMMUNICATIONS MEDIA FINGERPRINTS" filed May 30, 2022 which is hereby expressly incorporated by reference in its entirety.

Figure 3:
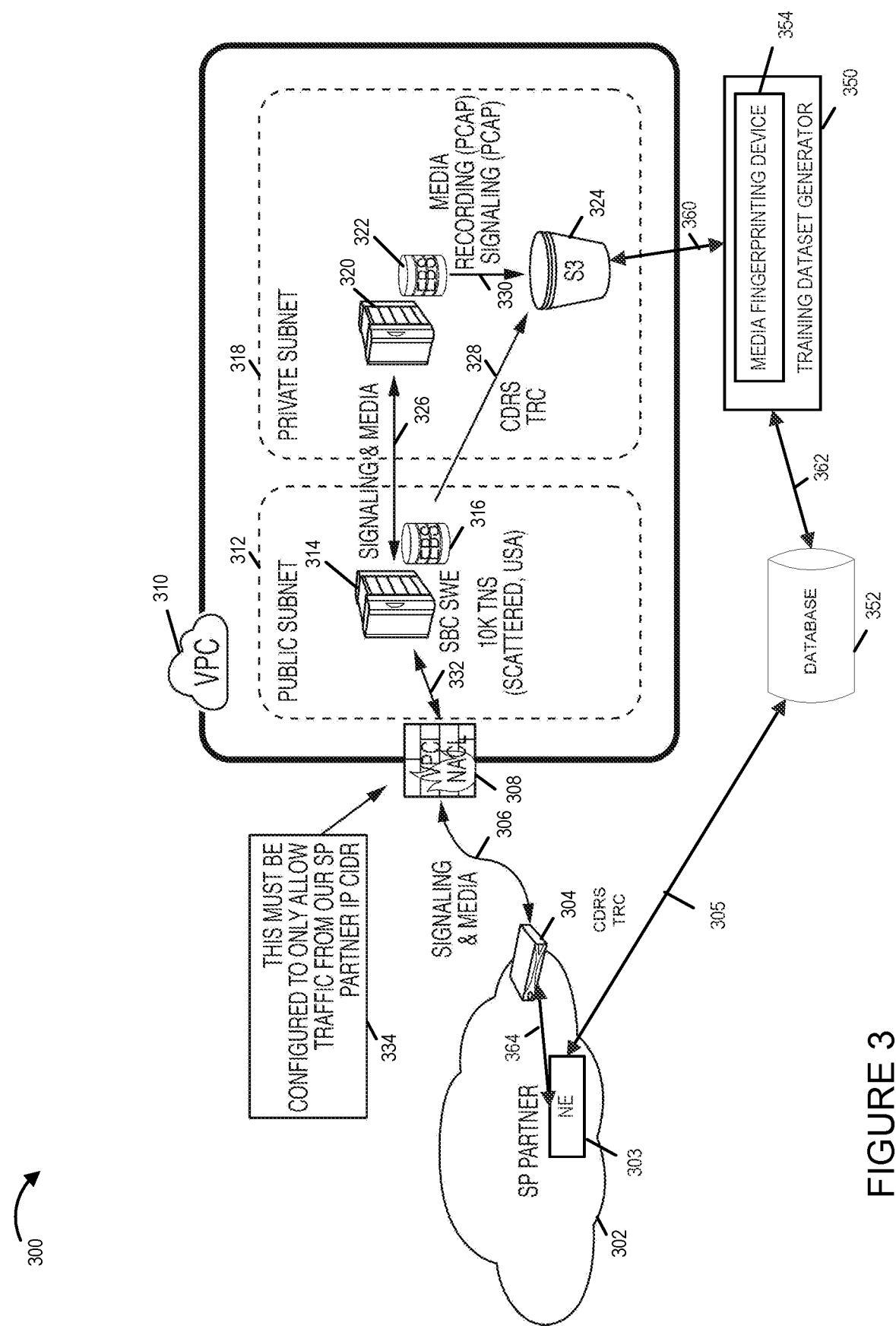
FIG. 3 illustrates an exemplary system in accordance with an embodiment of the present invention.

Another aspect or component of various embodiments of the present invention is a Honeypot infrastructure/system. FIG. 3 illustrates an exemplary system 300 including the architecture of an exemplary Honeypot infrastructure/system in accordance with an embodiment of the present invention. The exemplary Honeypot infrastructure/system includes a Service Provider (SP) Partner network 302 coupled to a Virtual Private Network (VPN) 310 via a Virtual Public Cloud (VPC) firewall 308 that implements a Network Access Control List (NACL) for security. The VPC firewall 308 is configured to only allow traffic, e.g., communications in the form of signaling & media from the Service Partner Internet Protocol (IP) Classless Inter-Domain Routing (CIDR), for security purposes as indicated in description box 334. The Virtual Public Cloud 310 includes a Public Subnet 312 and a Private Subnet 318. The Public Subnet 312 includes a Session Border Controller (SBC) 314, e.g., SBC Software Edition (SWe) and a database 316 (e.g., AWS EBS). The Private Subnet 318 includes a communications termination device 320, e.g., a PBX, a database 322, and an object storage device 324, e.g., Amazon S3 storage bucket. The Service Provider Partner is typically a carrier or Enterprise that provides communications services such as services for making calls. The SP Partner in this example is partnering with the operator of the honeypot system. The SP Partner network 302 includes a network device 304, e.g., an SBC, which forwards communications, e.g., calls, to the VPC firewall device/entity 308 over communications link 306, the communications including signaling and media, e.g., call control signaling (e.g., SIP signaling message) and communication media, e.g., digitized/encoded audio signals. The communications, e.g., calls, are communicated to the SBC 314 in the Public Subnet 312 via communications link 332. The SP Partner in this example handles communications for 10,000 (10K) telephone numbers. The telephone numbers are scattered throughout the US. This is achieved by having telephone numbers for different area codes corresponding to different regions of the United States. A portion or block of the 10K telephone numbers allocated by the carrier to the SP Partner of the SP Partner network 302 are unused telephone numbers in that they are allocated to SP Partner but are not assigned to a real subscriber. These unused telephone numbers likewise are scattered throughout the United States or any geographical area of interest or served by the Service Provider Partner.

In general terms the Honeypot infrastructure/system is a communication, e.g., call, terminating and recording infrastructure. For the customer, e.g., SP Partner, in question, a SIP trunk is set up between the carrier network and the SBC 314. The carrier then allocates a block of unused phone numbers, typically scattered across the served area for geographic diversity, and directs calls received for those numbers across the SIP trunk. Since these numbers are unallocated (to real subscribers), any communications, e.g., calls, received for the numbers are by definition unsolicited communications, e.g., unsolicited calls. The honeypot infrastructure/system accepts communications, e.g., calls, and captures the signaling associated with the communications, e.g., calls, and records the media received from the initiating, e.g., calling, party.

In exemplary system 300, communications for both unsolicited communications, e.g., calls, to unused numbers and regular communications, e.g., calls, assigned to actual subscribers are received at Service Provider (SP) network equipment 303 (e.g., equipment that generates communications media fingerprints, communications data records (e.g., Call Detail Records), and processes communications). In some embodiments the network equipment 303 includes a Session Border Controller or PBX. The SP network equipment 303 identifies communications to regular telephone numbers assigned to actual subscribers and directs or routes these communications to their assigned subscriber destinations. The SP network equipment 303 also identifies communications, e.g., signaling & media, of unsolicited calls for the unused telephone numbers and routes these communications to SBC 314 in the honeypot infrastructure via communications link 364, communications device 304, communications link 306, VPC firewall 308 and communications link 332. These unsolicited communications, e.g., signaling & media of unsolicited calls, for the unused telephone numbers are received by the SBC 314 which transmits them over communications link 326 to the PBX 320 for call termination processing. The PBX 320 records the media and signaling for each of the unsolicited communications and stores the recorded information in database 322. The network equipment 303 generates Communications Data Records, e.g., call detail records, for every communication, e.g., call, passing through it. This includes both the unsolicited calls to unused numbers and the regular calls assigned to actual subscribers. The network equipment 303 stores the Communications Data Records in the database 352 via communications link 305. The network equipment 303 also generates trace (TRC) records with media fingerprints for a plurality of calls passing through it. The network equipment 303 randomly samples a percentage (e.g., 0.5% of calls which is 1 in 200) of calls and collects the additional information including a media fingerprint for the call and full Packet Data Unit details. These TRC records with media fingerprints are generated in real-time by network equipment 303 without recording the audio of the call. The communications data records and trace records for a period of time, e.g., a first period of time, are then provided to and stored in database storage system 352 via communications link 305 which couples the network equipment device 303 to database storage system 352. The media fingerprints and signaling information for a period of time, e.g., a second period of time, are also generated by network equipment 303 and stored in database 352. In some embodiments, the first and second periods of times are the same.

In some embodiments the SBC 314 generates Communications Data Records, e.g., call detail records, for every communication, e.g., call, passing through it. This includes the unsolicited calls to unused numbers. The SBC 314 stores the Communications Data Records in the database 316. The SBC 314 also generates trace (TRC) records with media fingerprints for a plurality of calls passing through it (e.g., 0.5% of calls) and stores these media fingerprints in the database 316. The communications data records and trace records stores in database 316 are communicated to and stored in storage system 324.

Various analytics and post-processing is performed on the captured signaling and media in various embodiments of the present invention. In some embodiments, the analytics and post-processing are performed by the PBX 320 while in some other embodiments, the analytics and post-processing is performed by a media training dataset generator 350 which has access to the recorded media and signaling for the unused telephone numbers stored in the database 322 and/or the storage system 324. The training dataset generator 350 includes a processor and memory, the memory including instructions which control the operation of the training dataset generator 350 including performing the following post processing operations. The training dataset generator 350 is a media fingerprinting device. In some embodiments, training dataset generator 350 includes a media fingerprinting device or component 354. The training dataset generator 350 is coupled to the storage 324 via communications link 360 and to the database 352 via communications link 362.

Two types of post processing are of particular relevance. First, the communications identifying information, e.g., call identifying information (calling party, called party, timestamp, callid) for each communication, e.g., call, is prepared into a list and then filtered to eliminate instances that are likely not robocalls. For example, a calling party that makes a single communication, e.g., call, over a long window of time and very quickly hangs up the call is more likely to be a misdial than a robocall. Second, the communication media fingerprint, e.g., the audio fingerprint, of the recorded audio is computed/determined/generated. Duplicates are removed and the list of unique fingerprints are determined. Each of these is then "fuzzed" to produce a match locale, i.e., a set of fingerprints with slight variations, and the entire set of fingerprints comprising the locales of all communications, e.g., calls, is constructed. This becomes the match set for all robocall audio over the recording period. The generated media fingerprints (including the fuzzed fingerprints) are stored by the training set data generator 350 in database 352. In some embodiments, the media fingerprints are also stored with the corresponding CDR information obtained by the training dataset generator from the storage 324.

With respect to the recording of audio, previously it was discussed that the communications media fingerprinting method/algorithm did not require audio recording, but in this embodiment using the honeypot system the fingerprints are being computed from recorded audio within the honeypot. This is not required. Recording is permitted in some jurisdictions, e.g., certain states in the United States, with one party consent and in this case the receiving party operating the honeypot system is inherently consenting. However, as previously stated, the recording of audio and later generation of fingerprints is not required. A communications processing device, e.g., a fingerprinting device or SBC with fingerprinting functionality in various embodiments generates the fingerprints or captures information about the media of the communication from which the fingerprints can be generated in real-time, the audio of the communication not being recoverable from the captured information about the media. In some embodiments, the communications media fingerprints are generated by PBX 320 with the communications media fingerprints being stored in database 322 and storage system 324.

Figure 6:
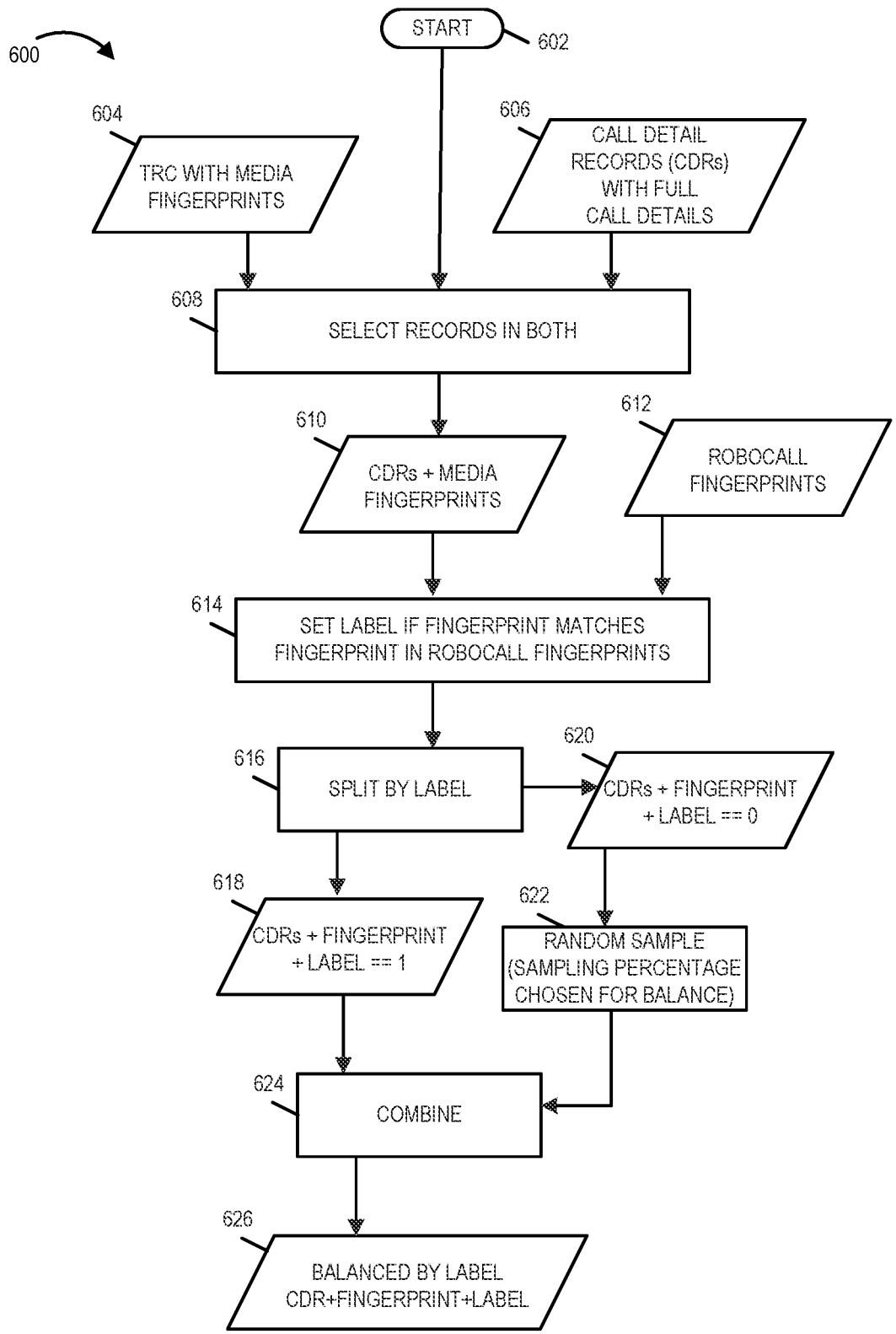
FIG. 6 illustrates a flowchart of an exemplary method in accordance with an embodiment of the present invention.

With this data in hand (i.e., in database 352), the training data set can be constructed according to the flowchart of method 600 illustrated in FIG. 6. Method 600 illustrates an exemplary method of generating a training data set for robocall communications in accordance with an embodiment of the present invention. The method 600 is implemented by training data generator 350 in the system 300 of FIG. 3.

Figure 10:
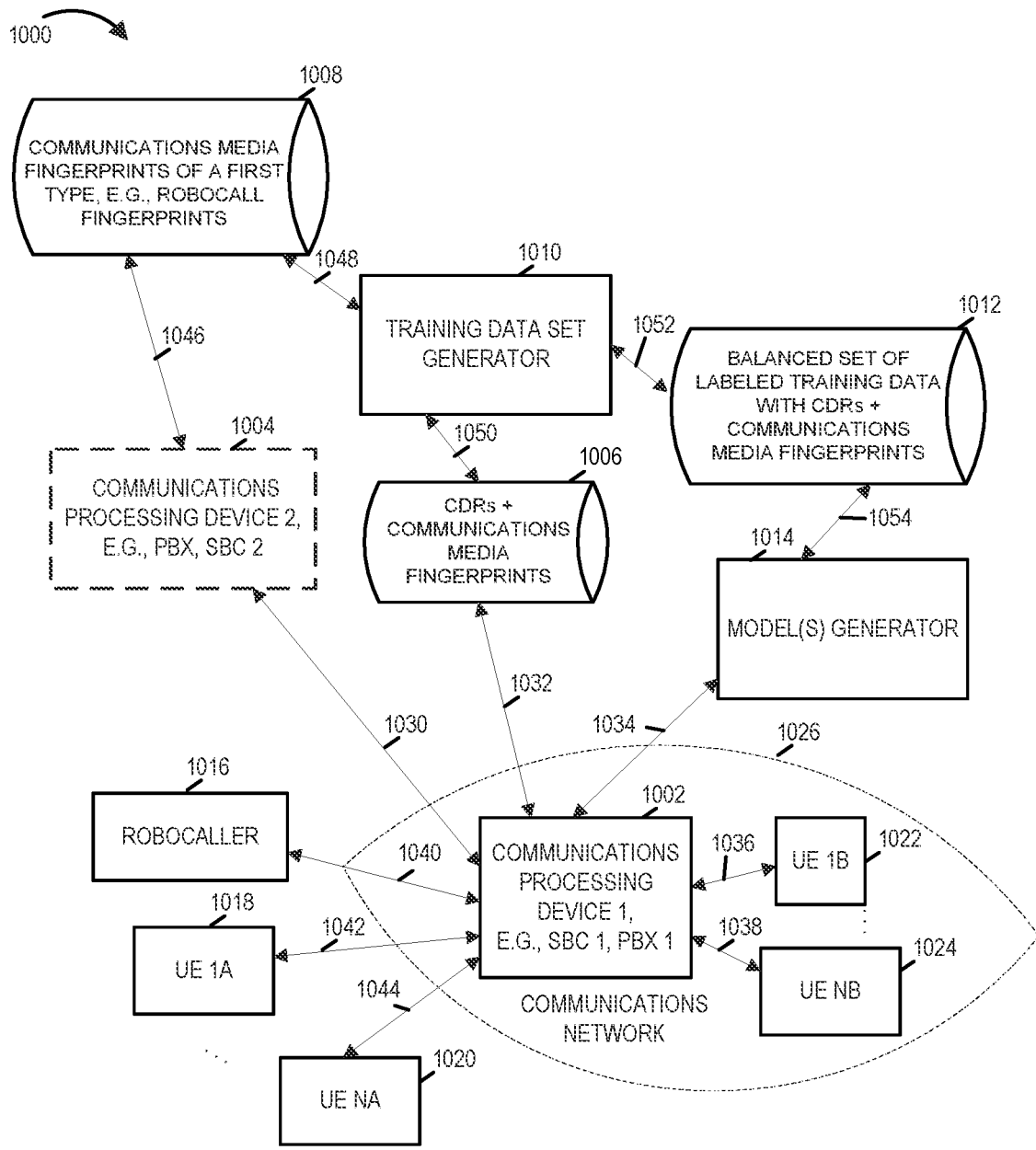
FIG. 10 illustrates an exemplary system in accordance with an embodiment of the present invention.

The method 600 may be, and in some embodiments is, implemented by a communications processing device such as for example the computing device 400. In some embodiments, the method 600 is implemented in FIG. 10 by the training data set generator 1010. In some embodiments, the method 600 is implemented by communications processing device 2 1004 in system 1000 wherein communications processing device 2 1004 includes the training data set generator 1010. In some embodiments, the method 600 is implemented by the communications processing device 1 1002 of system 1000 when the communications processing device 1 includes the training data set generator 1010. The system 1000 of FIG. 10 is discussed in further detail below.

The method 600 has three input datasets. The first input dataset is the CDR data set 606 which is the set of CDRs collected for the period of interest (e.g., the CDRS from SP network equipment device 303 stored in database 352 in connection with the system 300. In various embodiments, these are the STOP records collected by a network equipment device that performs communications processing, e.g., an SBC. These communications, e.g., calls, will have the same call identification information as collected from the honeypot list when the first set of communications media fingerprints and the second set of communications media fingerprints have the same calls as in the example discussed above in connection with FIG. 3. The honeypot also utilizes an SBC as its communications processing device. The second input dataset is the trace records dataset also referred to dataset of TRC records with media fingerprints 604. This second input dataset may be, and in some embodiments is, generated from a communications processing device, e.g., SBC with the functionality to randomly sample a percentage of communications its processes e.g., 0.5% (1 in 200) of communications, e.g., calls, and from these randomly sampled communications, the communications processing device collects in addition to CDR information additional information about those randomly sampled communications, e.g., calls, including full PDU (packet data unit) details and the media fingerprint of the start of the communication, e.g., call, for example, a portion of the call, e.g., 30 seconds. This fingerprinting of a communication's media by a communications processing device is implemented by a version of the method/algorithm without call recording. That is, the media of the call is not recorded. In connection with system 300, these are the TRC records stored in database 352 by SP network equipment 303. The third input dataset is the robocall fingerprints dataset 612 which is the set of fingerprint locales built from the honeypot collection as previously described. With respect to the system 300, the PBX 320 or the training data set generator 350 generated from the recorded media the set of fingerprint locales and stored them in database 352.

The list of communications, e.g., calls generated in the honeypot is used as a sanity check. For all communications, e.g., calls, collected/captured in the honeypot (recall that in some embodiments this is already filtered to only include likely robocalls), if present in the customer premise CDR with fingerprint dataset 618 or dataset 620 in flowchart of method 600 shown in FIG. 6, then it is expected that the label should be a 1. If a statistically significant portion are wrong, then it indicates a potential problem in the fingerprinting or the matching of fingerprints.

The method 600 commences with start step 602. Operation proceeds from step 602 to step 608. In step 608, records corresponding to the same communication included in both the TRC with media fingerprints dataset 604 and the communications detail records dataset 606 (e.g., call detail records when the communications are calls) are selected from these two datasets to form and/or generate the CDRs+media fingerprints dataset 610, for example, by executing an inner join database operation, e.g., an inner join SQL operation, on the records of the TRC with media fingerprints dataset 604 and the records of the communications detail records dataset 606. In this way, a communication's media fingerprint becomes associated with its corresponding CDR to form an entry in the CDRs+media fingerprints dataset 610. Operation proceeds from step 608 to step 614.

In labeling step 614, the media fingerprints from the CDRs+media fingerprints dataset 610 are compared to the media fingerprints from the robocall fingerprints dataset 612. If a media fingerprint from the CDRs+media fingerprints dataset 610 matches a media fingerprint in the robocall fingerprint dataset then the CDR+media fingerprint record is labeled with Label=1 which indicates that the CDR+media fingerprint record corresponds to a communication, e.g., a call, which is a robocall. Otherwise, the CDR+media fingerprint is labeled with Label=0 indicating that the CDR+media fingerprint record does not correspond to a robocall. In some embodiments, a left Join database operation, e.g., left Join SQL operation, is utilized as part of the labeling step 614. Operation proceeds from step 614 to step 616.

In step 616, the set of labeled CDRs+media fingerprints records dataset is split or divided into a CDRs+fingerprint+label==1 dataset 618 of records corresponding to communications identified as robocalls and a CDRs+Fingerprint+Label==0 dataset of records 620 corresponding to communications identified as non-robocalls. Operation proceeds from step 618 to step 622.

In step 622, the CDRs+Fingerprint+Label==0 dataset of records is randomly sampled. The sampling percentage is chosen for balance with CDRs+Fingerprint+Label==1 dataset. Operation proceeds from step 622 to step 624.

In step 624, the CDRs+Fingerprint+Label==1 dataset is combined with the random sampling of records from the CDRs+Fingerprint+Label==0 dataset to construct or generate a balanced by label CDR+Fingerprint+Label dataset 626, the balanced by label dataset 626 having an equal number of records or entries with a Label==1 as records/entries with a Label==0. For example, if there were 20 entries in the CDRs+Fingerprint+Label==1 dataset and 100 entries in the CDRs+Fingerprint+Label==0 dataset, then 20 randomly sampled entries from the 100 entries in the CDRs+Fingerprint+Label==0 dataset would be selected to be combined with the 20 entries in the CDRs+Fingerprint+Label==1 dataset to construct or generate a set of CDRs+Fingerprint+Label entries or records which is balanced by label with 20 entries/records that correspond to robocalls with Label==1 and 20 entries/records that correspond to non-robocalls with Label==0. There are typically less robocalls than non-robocalls. The method 600 outputs the dataset 626 which is an automatically labeled training set of communications data from which models, e.g., classification models, can be generated. The dataset 626 may be, and in some embodiments is, used as the training data in system 100 of FIG. 1. The method 600 may be, and in some embodiments is, implemented by a communications processing device with database processing capabilities and/or a database processing device or system. In some embodiments, the method 600 is implemented by a training data set generator device including a processor, memory, and one or more input/output interfaces with the memory including instructions which when executed by the processor control the training data set generator device to perform the steps of the method 600.

FIG. 10 illustrates an exemplary system 1000 in accordance with an embodiment of the present invention. System 1000 includes communications processing device 1 1002, e.g., Session Border Controller (SBC) 1 or PBX 1, optional communications processing device 2 1004, e.g., Session Border Controller (SBC) 2, a training data set generator 1010, a model(s) generator 1014, a robocaller 1016, and a plurality of user equipment devices UE 1A 1018, . . . UE NA 1020, UE 1B, . . . , UE MB, e.g., communications devices such as for example telephones, smartphones, computers, laptops, Session Initiation Protocol (SIP) Phones, Internet Protocol phones, mobile devices, etc. N and M being positive numbers greater than 1. In some embodiments, the communications processing device 1 1002 and/or the communications processing device 2 1004 is a networking equipment device with communications processing capabilities including one or more of the following: communications routing, communications recording, communications blocking, communications endpoint termination functionality, communications record generation/analysis, and/or communications media fingerprinting generation/analysis.

The communications processing device 1, and UE 1B, . . . , UE NB are part of a communications network 1026. In some embodiments, the communications network is an enterprise customer communications network or a carrier network. The system 1000 further includes databases 1006, 1008, and 1012. The database 1006 stores communications data records and communications media fingerprints generated by the communications processing device 1 from communications passing through communications network 1026. The database 1008 stores communications media fingerprints of a first type, e.g., robocall fingerprints, generated by the communications processing device 2 1004 from media of communications directed to telephone numbers or addresses (e.g., IP addresses) which are allocated but unused that is not assigned to an actual or real subscriber. The database 1012 stores a balanced set of labeled training data with communications media fingerprints and corresponding communications data records generated by the training data set generator 1010 for example using the method 600. In some embodiments, a single database is used instead of three separate databases. In some embodiments, the communications media fingerprints stored in database 1008 are generated in real-time as communications are processed while in some other embodiments at least some of the communications media fingerprints stored in the database 1008 are generated from stored recordings of media from communications directed to allocated but unused telephone numbers or addresses.

In some embodiments, the communications processing device 1 1002 is a first SBC which directs communications (e.g., calls) for allocated but unused telephone numbers and/or addresses to the communications processing device 2 1004 which is a second SBC. The communications device 2 1004 in turn directs the calls to a Private Branch Exchange (PBX) not shown. The PBX terminates the communications, records audio files from the communications and stores the audio files e.g., in database 1008. A fingerprint generating device not shown then accesses the stored audio files for the communications and generates the communications media fingerprints of a first type which are stored in the database 1008. In some embodiments, the PBX generates the communications media fingerprints of the first type from the stored audio files.

The system 1000 also includes a plurality of communications links (1030, 1032, 1034, 1036, 1038, 1040, 1042, 1044, 1046, 1048, 1050, 1052, and 1054 which couple and/or connect the devices/entities of the system 1000 together. The communications links may be wired, optical, cable or wireless. Communications links 1030, 1032, 1034, 1036, . . . , 1038, 1040, 1042, . . . , 1044 couple and/or connect communications processing device 1 1002 to communications processing device 2 1004, database 1006, model(s) generator 1014, UE 1B 1022, . . . , UE NB 1024, robocaller 1016, UE 1A 1018, . . . , UE NA 1020 respectively. Communications link 1046 couples and/or connections communications processing device 2 1004 to database 1008. Communications links 1048, 1050 and 1052 couple and/or connect the training data set generator 1010 to the database 1008, the database 1006, and the database 1012 respectively. The communications link 1054 couples the model(s) generator 1014 to the database 1012.

In the system 1000, the communications processing device 1 is configured to direct communications for telephone numbers or addresses (e.g., IP addresses) which are allocated but unused that is not assigned to an actual or real subscriber to communications processing device 2. These will be unsolicited calls for as explained above they are unused numbers or addresses which have not been assigned to actual subscribers. The communications processing device will generate communications media fingerprints from the media for these communications directed to the unused telephone numbers. In some embodiments, the communications media fingerprints are generated in real time from the communications received.

In some embodiments, at least some of the communications media fingerprints generated by the communications processing device 2 1004 are generated from stored communications media of a communication as the communications processing device records the media for each received call for example using a voice mail functionality and being a terminating device for the unused telephone numbers or addresses. In some embodiments, the unused telephone numbers and/or address are terminated at the communication processing device 1 1002 which generates the communications media fingerprints of a first type from communications received on these unused telephone numbers and/or addresses. In some such embodiments, the optional communications processing device 2 1004 is not implemented as its functionality is performed by the communications processing device 1 1002. In some embodiments, the training data set generator 1010 and the model(s) generator each include a processor and memory, the memory including instructions which when executed by the processor control the device in which they are included to perform various operations such as one or more of the steps of the methods disclosed herein. The communications processing device 1 1002 and communications processing device 2 are communications media fingerprinting devices in that they include functionality, components or devices which generate communications media fingerprints. In some embodiments, the communications processing device 1 1002 and/or the communications processing device 2 1004 are actually systems comprising multiple interconnected devices which perform the functions described in connection with their operation. The models, e.g., classification models, generated by the model(s) generator 1014 may be, and in some embodiments are, deployed to communications processing device(s), e.g., communications processing device 1 1002, in communications network 1026 or other different communications networks.

Figure 2A:
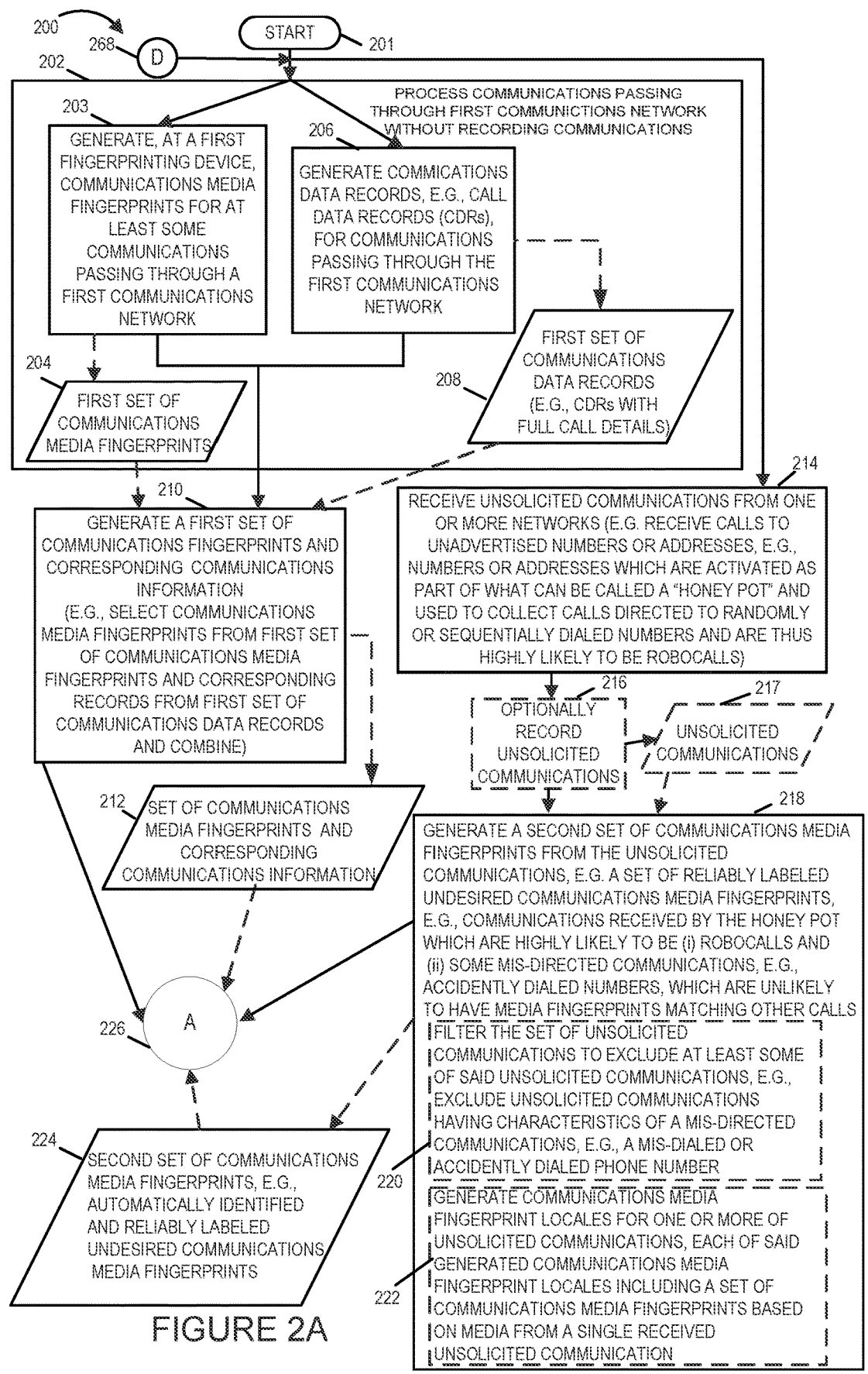
FIG. 2A illustrates a first part of a flowchart of an exemplary method in accordance with an embodiment of the present invention.
Figure 2B:
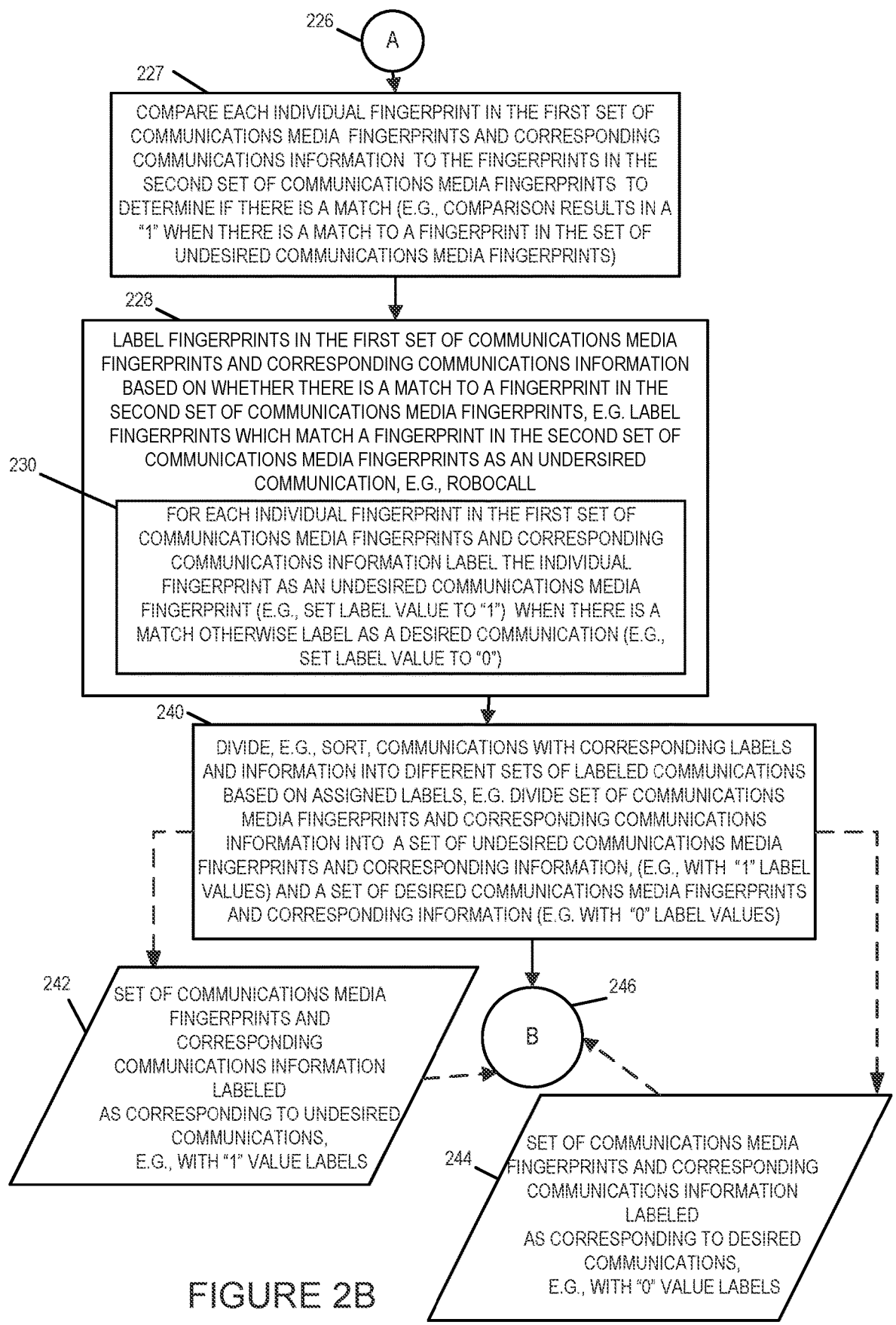
FIG. 2B illustrates a second part of a flowchart of an exemplary method in accordance with an embodiment of the present invention.
Figure 2C:
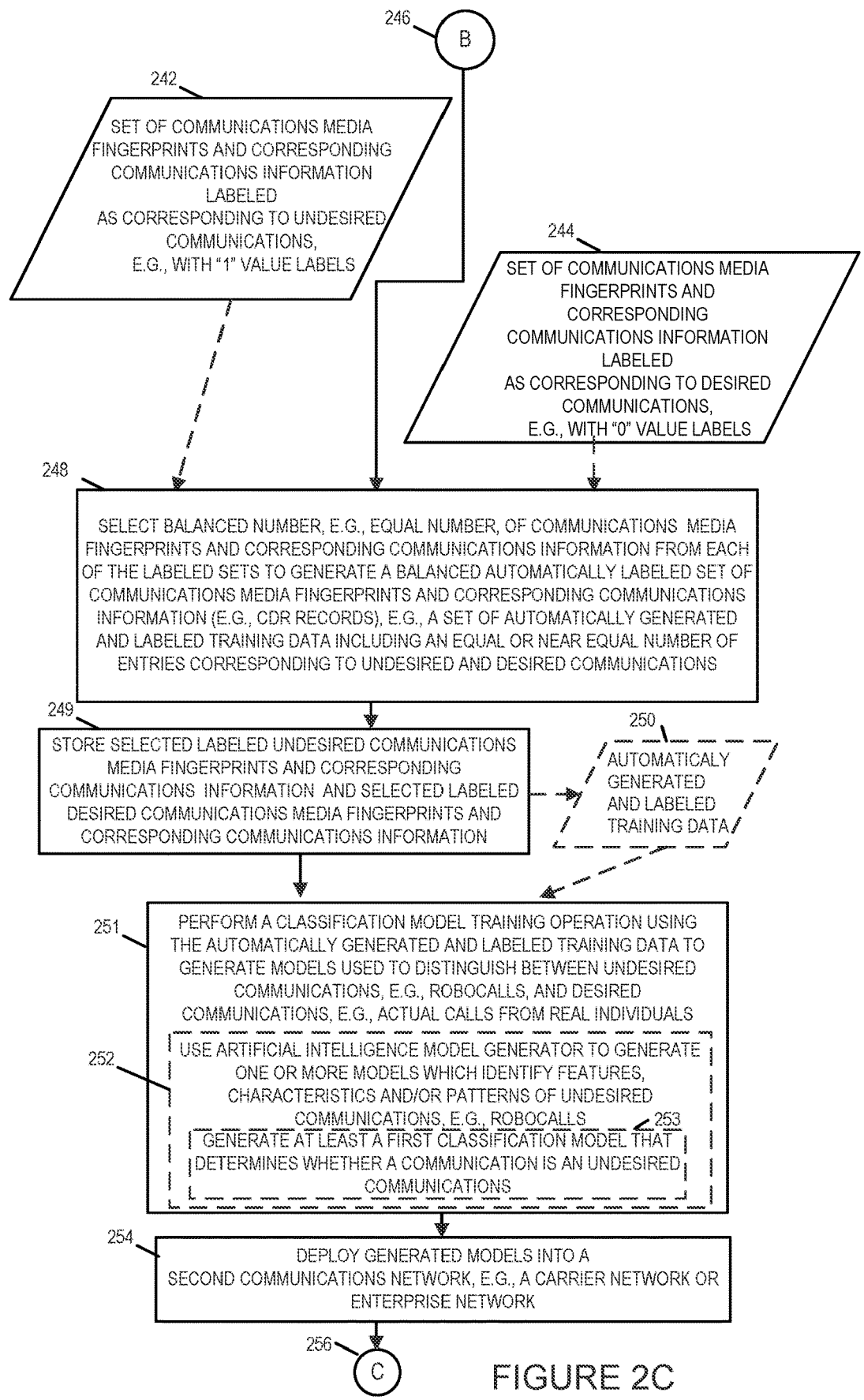
FIG. 2C illustrates a third part of a flowchart of an exemplary method in accordance with an embodiment of the present invention.

FIG. 2 comprises the combination of FIGS. 2A, 2B, 2C and 2D. FIG. 2A illustrates a first part of a flowchart of an exemplary method in accordance with an embodiment of the present invention. FIG. 2B illustrates a second part of a flowchart of an exemplary method in accordance with an embodiment of the present invention. FIG. 2C illustrates a third part of a flowchart of an exemplary method in accordance with an embodiment of the present invention. FIG. 2D illustrates a fourth part of a flowchart of an exemplary method in accordance with an embodiment of the present invention. The flowchart in FIG. 2 illustrates exemplary method 200 in accordance with another embodiment of the present invention. The exemplary method 200 may be, and in some embodiments is, implemented using the exemplary system 1000 shown in FIG. 10. However, it should be understood that the method is not limited to a particular system or configuration.

Method 200 starts in step 201. Operation proceeds from start step 201 to steps 202 and 214.

In step 202, a communications processing entity or device (e.g., a fingerprinting entity or device, a Session Border Controller (SBC)), network equipment device) processes communications passing through a first communication network without recording the media of the communications. Step 202 includes sub-steps 203 and 206.

In sub-strep 203, communications media fingerprints for at least some communications passing through a first communications network is generated at a first fingerprinting device or entity, the at least some communications media fingerprints generated at the first fingerprinting device being a first set of communications media fingerprints 204. In some embodiments, the communications processing entity is or includes the first fingerprinting entity or device. In some embodiments, the communications processing entity or device is a Session Border Controller. In some embodiments, the first fingerprinting entity or device is a Session Border Controller.

In sub-step 206, communications data records, e.g., call data records (CDRs) when the communications are calls, are generated for communications passing through the first communications network, the generated communications data records forming a first set of communications data records 208, e.g., CDRs with full call details. Exemplary fields for a communications data record for a call are described in U.S. Provisional Patent Application 62/595,311 filed Dec. 6, 2017 entitled, "METHODS AND APPARATUS FOR DETECTION AND MITIGATION OF ROBOCALLS," which is hereby expressly incorporated by reference in its entirety including its appendices. In some embodiments, the communications data records are generated by the communications processing entity or device and/or the first fingerprinting device or entity. In some embodiments, the sub-steps 203 and 206 are performed by the same device or entity, e.g., an SBC.

Operation proceeds from step 202 to step 210.

In step 210, a first set of communications media fingerprints and corresponding communications information is generated (e.g., by selecting communications media fingerprints from the first set of communications media fingerprints and corresponding records from the first set of communications data records and combining them). In some embodiments, step 210 is a sub-step of step 202. In some such embodiments, sub-steps 203 and 206 are sub-steps of step 210. In some embodiments, sub-step 203 is a sub-step of sub-step 206.

In some embodiments step 202 is skipped and in step 210 the first set of communications media fingerprints and corresponding communication information is generated by a communications processing device in real time based on communications passing through the first network without recording the communications media. The output of the step 210 is the first set of communications media fingerprints and corresponding communications information 212. Operation proceeds from step 210 via connection node 226 to step 227 shown on FIG. 2B.

Returning to step 214. In step 214, unsolicited communications from one or more networks are received by a communications processing device, e.g., a communications media fingerprinting device. In some embodiments, the communications media fingerprinting device is an SBC. In some embodiments, the unsolicited communications are calls to unadvertised numbers or addresses (e.g., telephone numbers, IP addresses, e-mail addresses) which are activated as part of what can be called a "honey pot" and used to collect calls directed to randomly or sequentially dialed numbers and are thus highly likely to be robocalls. System 300 illustrates an exemplary honey pot in accordance with an embodiment of the present invention. Operation proceeds from step 214 to optional step 216.

In optional step 216, unsolicited communications are recorded, e.g., the media (e.g., digital audio signals) of the communications are recorded and/or captured and stored for future use. The output of the optional step 216 is the recorded unsolicited communications 217. Operation proceeds from step 216 to step 218. When optional step 216 is not implemented operation proceeds from step 214 to step 218.

In step 218, a second set of communications media fingerprints from the unsolicited communications, e.g., a set of reliably labeled undesired communications media fingerprints, e.g., communications received by the honey pot which are highly likely to be (i) robocalls and (ii) some mis-directed communications, e.g., accidently dialed numbers, which are unlikely to have communications media fingerprints matching other calls. In embodiments, where the optional step 216 is performed the second set of communications media fingerprints are generated from the recorded or captured media of the unsolicited communications 217. In such embodiments, the generation of the second set of communications media fingerprints does not need to occur in real-time as calls are received but instead is generally done off-line, e.g., using batch processing. Step 218 is implemented by a communications processing device including fingerprinting functionality. In some embodiments, the communications processing device is an SBC. In some embodiments, the communications processing device is a fingerprinting device or entity.

In some embodiments, step 218 includes one or more sub-steps 220 and 222. In sub-step 220, unsolicited communications are filtered so as to exclude at least some of said unsolicited communications, e.g., excluding communications having characteristics of a mis-directed communications, e.g., a mis-dialed or accidently dialed telephone number. In some embodiments, the unsolicited communications 217 are filtered prior to generating the second set of communications media fingerprints from the unsolicited communications. In some other embodiments, at least some of the unsolicited communications are filtered in real-time as calls are received and processed, e.g., based on the length of the call. In yet other embodiments, at least some of the unsolicited calls are filtered from the second set of communications media fingerprints during generation of the second set of communications media fingerprints and/or after the second set of communications media fingerprints have been generated.

In sub-step 222, communications media fingerprint locales are generated for one or more of the unsolicited communications. Each of the communications media fingerprint locales includes a set of communications media fingerprints based on media from a single received unsolicited call, the generated communications media fingerprint locales being part of the generated second set of communications media fingerprints. In some embodiments a communications media fingerprint locale is generated for each of the unsolicited communications for which a communications media fingerprint is generated. In some embodiments, each communications media fingerprint includes a set of frequencies, and each locale is generated by modifying one or more frequencies in the set of frequencies for the particular communications media fingerprint. In some embodiments, each fingerprint locale includes a set of fuzzy fingerprints. In some embodiments, each communications media fingerprint and its corresponding set of fuzzy fingerprints is generated using the techniques described in the U.S. Provisional Patent Application Ser. No. 63/346,989 entitled, "METHODS AND APPARATUS FOR GENERATING AND/OR USING COMMUNICATIONS MEDIA FINGERPRINTS" filed May 30, 2022.

As shown in FIG. 2A, the output of step 218 is the second set of communications media fingerprints 224, e.g., automatically identified and reliably labeled undesired communications media fingerprints. Operation proceeds from step 218 via connection node A 226 to step 227 shown on FIG. 2B.

In step 227, each individual fingerprint in the set of communications media fingerprints and corresponding communications information is compared to the fingerprints in the second set of communications media fingerprints to determine if there is a match (e.g., comparison results in a "1" when there is a match to a fingerprint in the set of undesired communications media fingerprints). Operation proceeds from step 227 to step 228.

In step 228, fingerprints in the set of communications media fingerprints and corresponding communications information are labeled based on whether there is a match to a fingerprint in the second set of communications media fingerprints, e.g., label fingerprints which match a fingerprint in the second set of communications media fingerprints as an undesired communication, e.g., a robocall. In some embodiments step 228 includes sub-step 230.

In sub-step 230, for each individual communications media fingerprint in the set of communications media fingerprints and corresponding communications information label the individual fingerprint as an undesired communication media fingerprint (e.g., set label value to "1") when there is a match; otherwise, label it as a desired communication (e.g., set label value to "0"). Operation proceeds from step 228 to step 240.

In step 240, divide, e.g., sort, communications with corresponding labels and information into different sets of labeled communications based on assigned labels, e.g., divide the set of communications media fingerprints and corresponding information into a set of undesired communications media fingerprints and corresponding information 242 (e.g., with "1" label values) and a set of desired communications media fingerprints and corresponding information 244 (e.g., with "0" label values). A set of communications media fingerprints and corresponding communications information 242 labeled as corresponding to undesired communications is outputted from step 240 along with a set of communications media fingerprints and corresponding communications labeled as corresponding to desired communications 244. Operation proceeds from step 240 via connection node B 246 to step 248 shown on FIG. 2C.

In step 248, a balanced number, e.g., equal number, of communications media fingerprints and corresponding communications information is selected from each of the labeled sets to generate a balanced automatically labeled set of communications media fingerprints and corresponding communications information (e.g., CDRs), e.g., a set of automatically generated and labeled set of training data 250 including an equal or near equal number of entries corresponding to undesired and desired communications, a near equal number of entries corresponding to undesired and desired communications being a number of entries within a threshold value of one another such as within 1%, 5% or 10% difference of one another (e.g., for a 10% difference there would be 40 undesired communications and 60 desired communications or 60 undesired communications and 40 desired communications). Operation proceeds from step 248 to step 249.

In step 249, the automatically generated and labeled training data 250 which is the selected labeled undesired communications media fingerprints and corresponding communications information, and the selected labeled desired communications media fingerprints and corresponding information is stored in a storage device, e.g., memory or a database system.

Operation proceeds from step 249 to step 251. In step 251, perform a classification model training operation using the automatically generated and labeled training data 250 to generate models used to distinguish between undesired communications, e.g., robocalls, and desired communications, e.g., actual call from real individuals. In some embodiments, step 251 includes sub-step 252. In sub-step 252 use an artificial intelligence model generator to generate one or more models which identify features, characteristics and/or patterns of undesired communications, e.g., robocalls. In some embodiments sub-step 252 includes sub-step 253. In sub-step 253, generate at least a first classification model that determines whether a communication is an undesired communication. Operation proceeds from step 251 to step 254.

In step 254, deploy the generated models into a second communications network, e.g., a carrier network or enterprise network. Operation proceeds from step 254 via connection node C 256 to step 258 shown on FIG. 2D.

In step 258, use the generated model(s) to identify undesired communications in the second communications network. In some embodiments, step 258 includes one or more sub-steps 260, 262, and 264. In sub-step 260, generate real time communications media fingerprints for received communications. In sub-step 262, use the generated model(s) to identify undesired communications based on generated real time communications media fingerprints and/or corresponding information/data for received communications. In sub-step 264, use the generated model(s) to identify undesired communications in the second communication network. One or more of the generated models is based features, characteristics and/or patterns of undesired communications only included in communications data record(s) (e.g., call data records) and not the media of a communication. Operation proceeds from step 258 to step 266.

In step 266, block undesired communications while allowing desired communications to complete to intended destination. Operation proceeds from step 266 via connection node D 268 to steps 202 and 214 to repeat the process.

Figure 7A:
FIG. 7A illustrates a first part of a flowchart of an exemplary method in accordance with an embodiment of the present invention.
Figure 7B:
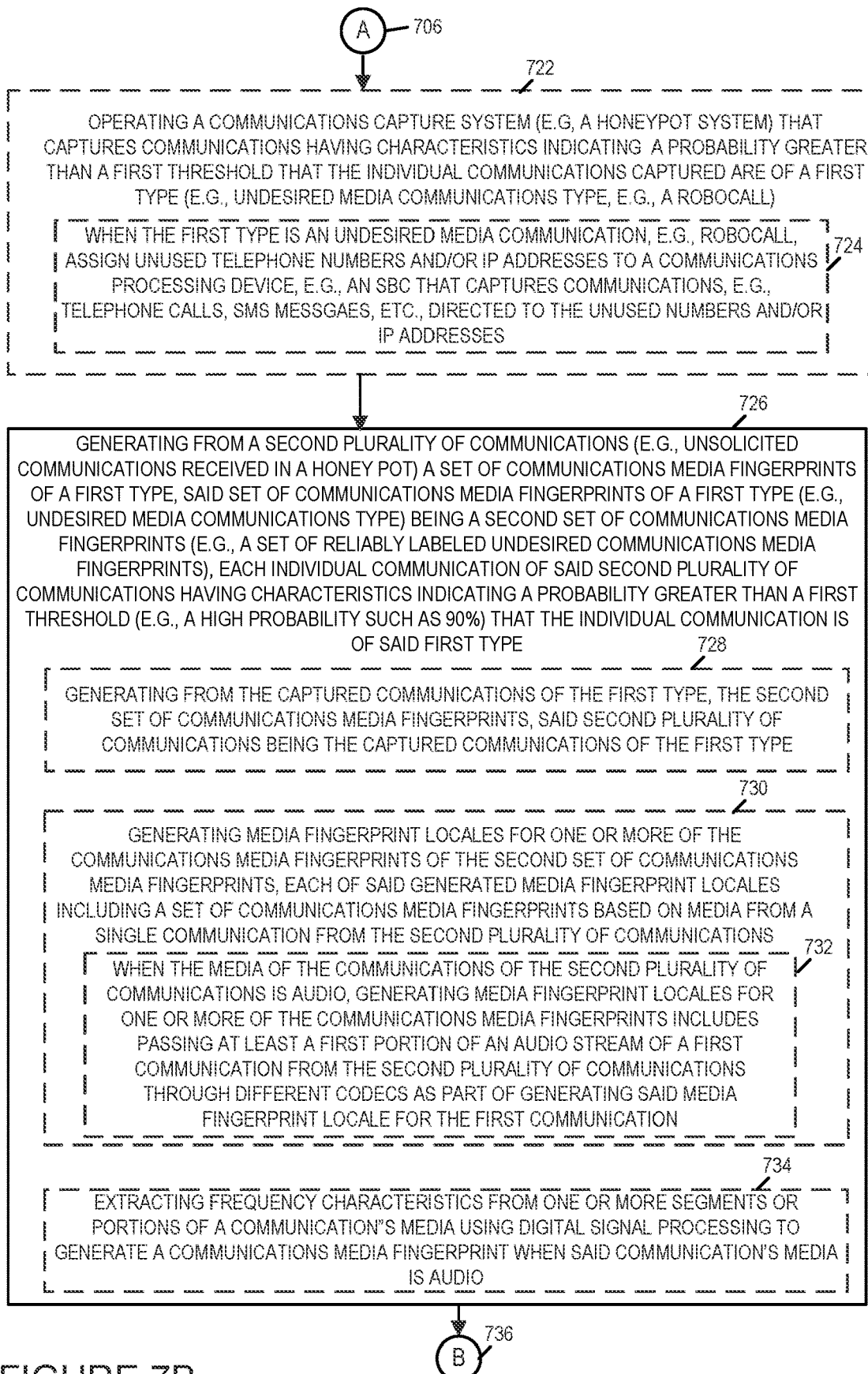
FIG. 7B illustrates a second part of a flowchart of an exemplary method in accordance with an embodiment of the present invention.
Figure 7C:
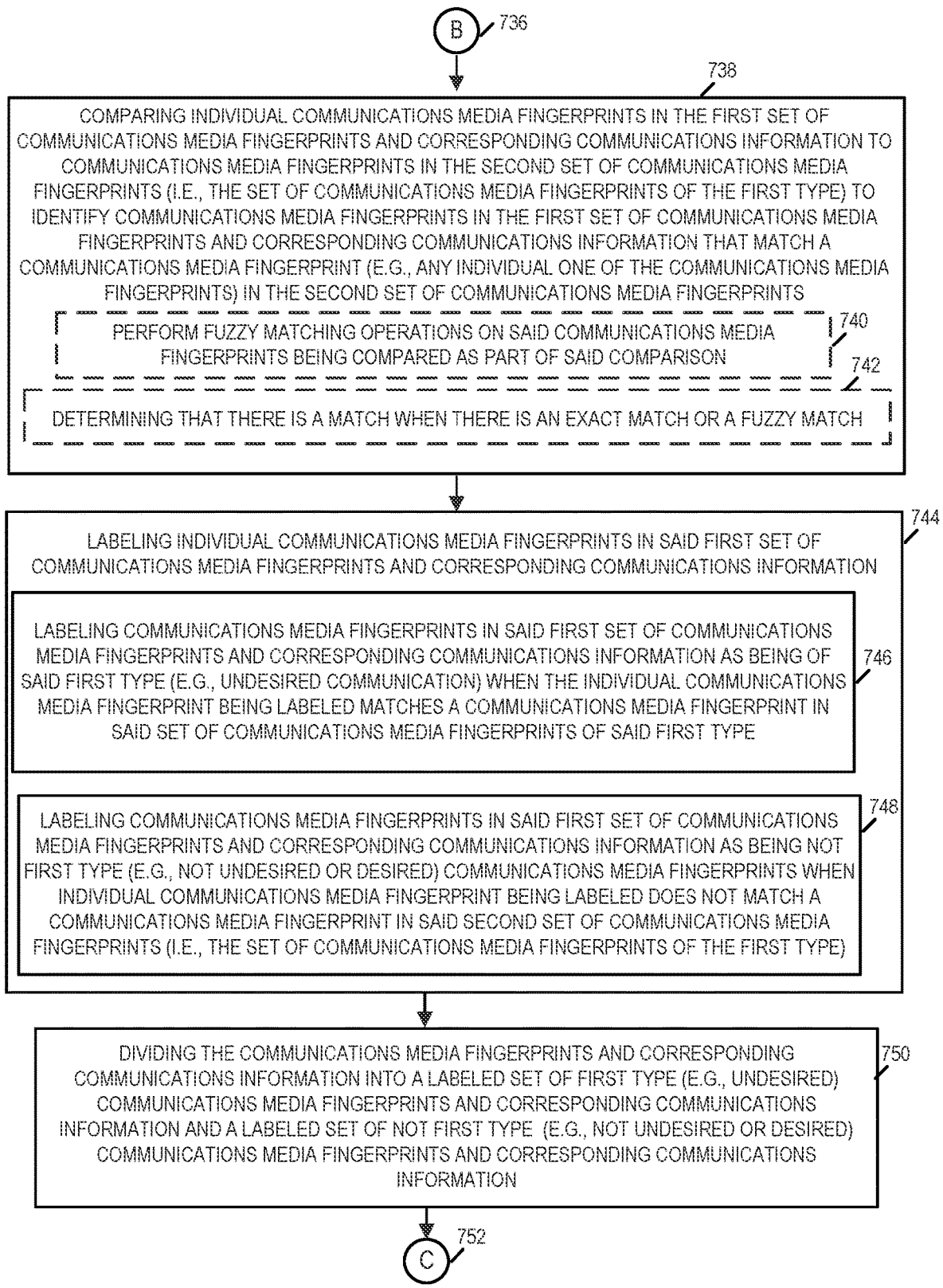
FIG. 7C illustrates a third part of a flowchart of an exemplary method in accordance with an embodiment of the present invention.
Figure 7D:
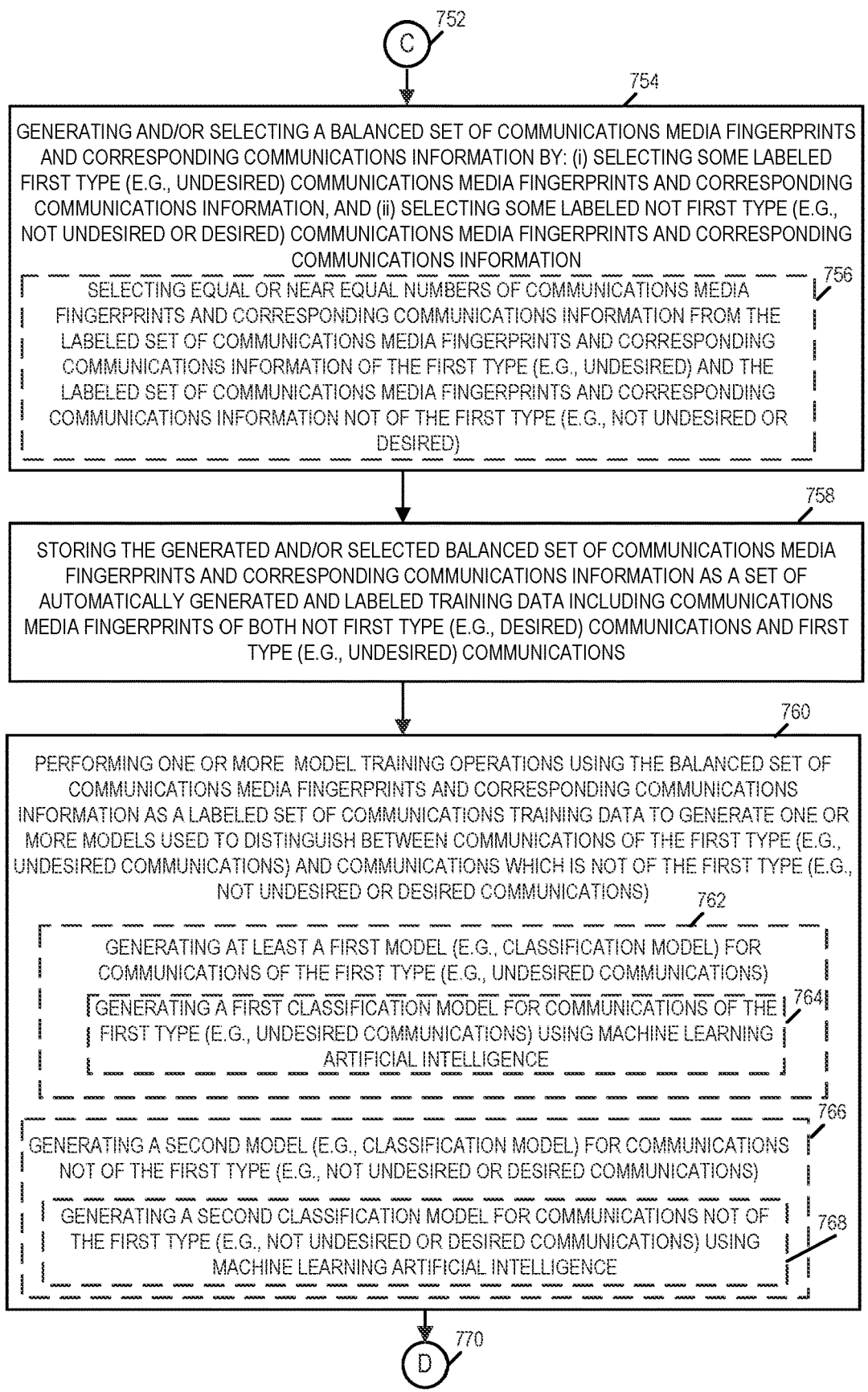
FIG. 7D illustrates a fourth part of a flowchart of an exemplary method in accordance with an embodiment of the present invention.

FIG. 7 comprises the combination of FIGS. 7A, 7B, 7C, 7D and 7E. FIG. 7A illustrates a first part of a flowchart of an exemplary method 700 in accordance with an embodiment of the present invention. FIG. 7B illustrates a second part of a flowchart of an exemplary method 200 in accordance with an embodiment of the present invention. FIG. 7C illustrates a third part of a flowchart of an exemplary method in accordance with an embodiment of the present invention. FIG. 7D illustrates a fourth part of a flowchart of an exemplary method in accordance with an embodiment of the present invention. FIG. 7E illustrates a fifth part of a flowchart of an exemplary method in accordance with an embodiment of the present invention.

Method 700 starts in step 702. Operation proceeds from start step 702 to step 704 and to step 722 via connection node A 706.

In step 704 a first set of communications media fingerprints and corresponding communications information (e.g., communications data record (CDR) information) is generated from a first plurality of communications passing through a first communications network. The communications media fingerprints included in the first set of communications media fingerprints and corresponding communications information is a first set of communications media fingerprints. In some embodiments, a communications processing entity/device performs step 704. In some embodiments, the communications processing entity/device is a Session Border Controller. In some embodiments, the communications processing entity/device includes a communications media fingerprinting entity/device and/or functionality. In some embodiments step 704 includes one or more sub-steps 708, 712, 714, 716, 718. In some embodiments, each entry in the first set of communications media fingerprints and corresponding information is stored in a record. In various embodiments, communications information for an individual communication includes one or more of the following: communication source identifier (e.g., calling party name, calling party number), communication destination identifier (e.g., called party name, called party number), communication source IP address, communication destination IP address, communication start time, communication completion or termination time, media type (audio call, video call, audio/video call, e-mail, text message, SMS message), SIP-User-Agent content, Via header content and format, ingress trunk group, egress trunk group, geographical location information for origin of communication, geographical destination information for destination of communication, area code and/or country code of origin of communication, area code and/or country code of destination of communication.

In sub-step 708, the first set of communications media fingerprints is generated at a first fingerprinting device from the first plurality of communications. In some embodiments, the first fingerprinting device is an SBC, e.g., the SBC includes fingerprinting functionality such as for example a communications media fingerprinting module, component, or logic. In some embodiments sub-step 708 includes sub-step 710. In sub-step 710, frequency characteristics are extracted from one or more segments or portions of a communication's media using digital signal processing to generate a communications media fingerprint when said communications media is audio. In some embodiments, the digital signal processing includes performing a discrete Fourier transform operation on the one or more digital audio segment or portions of the communication.

In sub-step 712, communications data records (CDRs) are generated, e.g., by a communications processing entity/device such as an SBC, for communications passing through the first communications network, at least some of the communications data records correspond to communications for which communications media fingerprints where generated, e.g., at or by the first fingerprinting device.

In sub-step 714, a first set of communications data records (e.g., CDRs) is generated for communications passing through the first communications network, at least some of said communications data records corresponding to communications for which communications media fingerprints were generated at and/or by the first fingerprinting entity/ device, said CDRs being call data records also sometimes referred to as call detail records when the communications are calls, e.g., telephone calls, Voice Over Internet Protocol (VOIP) calls, or Session Initiation Protocol (SIP) call sessions. Sub-step 714 is performed by a communications processing entity/device such as for example a Session Border Controller.

In sub-step 716, individual communications media fingerprints in the first set of communications media fingerprints are associated with corresponding communications information (e.g., each entry or record in the first set of communications media fingerprints and corresponding information includes a communications media fingerprint and corresponding CDR information for the communication to which the communications media fingerprint corresponds where the CDR information is from the first set of communications data records).

In sub-step 718, individual call data/detail records are associated with corresponding communications media fingerprints to generate entries in the first set of communications media fingerprints and corresponding communications information from the communication to which the entry corresponds (e.g., in the first set of communications media fingerprints and corresponding information record 1 includes the communication media fingerprint for communications 1 and corresponding communications data record information for communication 1; record 2 includes the communications media fingerprint for communication 2 and corresponding communications data record information for communications 2; and so on).

In various embodiments step 704 and one or more of its sub-steps are implemented by a single communications processing entity/device that generates both the first set of communications media fingerprints and the first set of communications data records from the first plurality of communications. In some embodiments, step 704 is implemented by one or more entities or devices such a first communications data record generating device/entity which generates the CDRs and a first fingerprinting device/entity which generates the first set of communications media fingerprints. In some embodiments, one or more of the communications data records include signaling information or information derived from signaling information for an individual communication to which the signaling information belongs and/or corresponds.

Operation proceeds from step 704 via connection node B 736 to step 738 shown on FIG. 7C.

Returning to step 722, in step 722 shown on FIG. 7B, a communications capture system (e.g., a honeypot system) is operated to capture communications having characteristic(s) indicating a probability greater than a first threshold that the individual communications captured are of a first type (e.g., undesired media communications type, e.g., a robocall). In some embodiments, step 722 includes sub-step 724. In sub-step 724, when the first type is an undesired media communication, e.g., a robocall, unused telephone number and/or IP addresses are assigned to a communications processing device/entity, e.g., an SBC that captures communications, e.g., calls, SMS messages, etc. directed to the unused telephone numbers and/or IP addresses. In various embodiments, step 722 is an optional step. Operation proceeds from step 722 to step 726.

In step 726, a set of communications media fingerprints of a first type is generated from a second plurality of communications (e.g., unsolicited communications received in a honey pot), the set of communications media fingerprints of a first type (e.g., undesired media communications type) being a second set of communications media fingerprints (e.g., a set of reliably labeled undesired communications media fingerprints), each individual communication of said second plurality of communications having characteristic(s) indicating a probability greater than a first threshold (e.g., a high probability such as 90%) that the individual communication is of the first type. In some embodiments, step 726 includes one or more sub-steps 728, 730 and 734. In some embodiments, step 726 includes labeling communications media fingerprints generated from a communication of the second plurality of communications as a communications media fingerprint of the first type (e.g., undesired communication).

In sub-step 728, the second set of communications media fingerprints is generated from captured communications of the first type, the second plurality of communications being the captured communications of the first type.

In sub-step 730, media fingerprint locales for one or more of the communications media fingerprints of the second set of communications media fingerprints is generated. Each of the generated media fingerprint locales includes a set of communications media fingerprints based on media from a single communication from the second plurality of communications. In some embodiments, sub-step 730 includes a sub-step 732. In sub-step 732, when the media of the communications of the second plurality of communications is audio, part of generating the media fingerprint locale for a communication, e.g., a first communication of the second plurality of communications, includes passing at least a first portion of an audio stream of the communication, e.g., first communication, through different codecs.

In sub-step 734, generating a communications media fingerprint includes extracting frequency characteristics from one or more segments or portions of a communication's media using digital signaling processing. In some embodiments, the digital signal processing includes performing a discrete Fourier transform operation on the one or more digital audio segment or portions of the communication.

In some embodiments, the first plurality of communications are telephone calls; and the second plurality of communications are telephone calls. In some embodiments, the first type is an undesired communication (e.g., a robocall); and the characteristics indicating a probability greater than a first threshold that the individual communication is of said first type include: (i) the communication is a telephone call, and (ii) that the communication is directed to an unused destination telephone number.

In some embodiments, each of said communications which are included in said first plurality of communications is different than each of said communications which are included in said second plurality of communications (e.g., none of the communications, e.g., calls, which are included in the first plurality of communications are included in the second plurality of communications, e.g., because they are communications, e.g., calls, from non-overlapping time periods or different country regions).

In some embodiments, one or more of said communications which are included in said first plurality of communications is included in said second plurality of communications. In some embodiments, a first communication is included in said first plurality of communications and said second plurality of communications, said first communications being used to generate an entry in the first set of communications media fingerprints and an entry in the second set of communications media fingerprints.

Operation proceeds from step 726 via connection node 736 to step 738 shown on FIG. 7C.

In step 738, individual communications media fingerprints in the first set of communications media fingerprints and corresponding information are compared to communications media fingerprints in the second set of communications media fingerprints (i.e., the set of communications media fingerprints of the first type) to identify communications media fingerprints in the first set of communications media fingerprints and corresponding information that match a communications media fingerprint (e.g., any individual one of the communications media fingerprints) in the second set of communications media fingerprints. In some embodiments, step 738 includes one or more sub-steps 740 and 742. In sub-step 740, fuzzy matching operations are performed on the communications media fingerprints being compared as part of said comparison. In sub-step 742, determining that two communications media fingerprints which are being compared match when there is an exact match or a fuzzy match. In various embodiments, a fuzzy match is a match between a fingerprint being evaluated to one of the fuzzy fingerprints generated as part of a set of fingerprints making up a fingerprint locale for a communications media fingerprint generated from a communication, e.g., a first communication of the second plurality of communications.

Operation proceeds from step 738 to step 744.

In step 744, individual communications media fingerprints in the first set of communications media fingerprints and corresponding communications information are labeled. In some embodiments, step 744 includes one or more sub-steps 746 and 748. In sub-step 746, communications media fingerprints in the first set of communications media fingerprints and corresponding communications information are labeled as being of the first type (e.g., undesired communication) when the individual communications media fingerprint being labeled matches a communications media fingerprint in the second set of communications media fingerprints (i.e., the set of communications media fingerprints of the first type). In sub-step 748, communications media fingerprints in the first set of communications media fingerprints and corresponding communications information are labeled as not first type communications media fingerprints when the individual communications media fingerprint being labeled does not match a communications media fingerprint in the second set of communications media fingerprints (i.e., the set of communications media fingerprints of the first type). Operation proceeds from step 744 to step 750.

In step 750, the communications media fingerprints and corresponding communications information is divided into a labeled set of first type (e.g., undesired) communications media fingerprints and corresponding communications information and a labeled set of not first type (e.g., not undesired or desired) communications media fingerprints and corresponding communications information. Operation proceeds from step 750 via connection node C 752 to step 754 shown on FIG. 7D.

In step 754, a balanced set of communications media fingerprints and corresponding communications information is generated and/or selected by: (i) selecting some labeled first type (e.g., undesired) communications media fingerprints and corresponding communications information, and, (ii) by selecting some labeled not first type (not undesired or desired) communications media fingerprints and corresponding communications information. In some embodiments step 754 includes sub-step 756. In sub-step 756, equal or near equal numbers of communications media fingerprints and corresponding communications information from the labeled set of communications media fingerprints and corresponding communications information of the first type (e.g., undesired) and the labeled set of communications media fingerprints and corresponding communications information not of the first type (e.g., not undesired or desired). In some embodiments, the labeled set of not first type (e.g., desired) communications media fingerprints and corresponding communications information includes more records (e.g., 10 times or some other multiple) than the labeled set of first type (e.g., undesired) communications media fingerprints. In some such embodiments, the balanced set of communications media fingerprints and corresponding communications information includes an equal or near equal number of records corresponding to desired communications and undesired communications. Operation proceeds from step 754 to step 758.

In step 758, the generated and/or selected balanced set of communications media fingerprints and corresponding communications information is stored as a set of automatically generated and labeled training data including communications media fingerprints of both not first type (e.g., desired) communications and first type (e.g., undesired) communications is stored, e.g., in memory, a storage device, a database system. Operation proceeds from step 758 to step 760.

In step 760, one or more model training operations is performed using the balanced set of communications media fingerprints and corresponding communications information as a labeled set of communications training data to generate one or more models used to distinguish between communications of the first type (e.g., undesired communications) and communications of the second type (e.g., desired or not undesired communications). In some embodiments step 760 includes one or more sub-steps 762 and 766. In sub-step 762, at least a first model (e.g., classification model) for communications of the first type (e.g., undesired communications) (e.g., useful for identifying communications of the first type) is generated. In some embodiments sub-step 762 includes sub-step 764. In sub-step 764, a first classification model for communications of the first type (e.g., useful for identifying communications of the first type) is generated using machine learning artificial intelligence. In sub-step 766, a second model (e.g., classification model) for communications not of the first type (e.g., desired communications or not undesired communications) (e.g., useful for identifying communications of the second type) is generated. In some embodiments sub-step 766 includes sub-step 768. In sub-step 768, a second classification model for communications not of the first type (e.g., useful for identifying communications which are not of the first type (e.g., desired communications) is generated using machine learning artificial intelligence. Operation proceeds from step 760 via connection node D 770 to step 772 shown on FIG. 7E.

In step 772, one or more of the generated models is deployed in a communications network, e.g., a second communications network. In some embodiments, step 772 includes one or more sub-steps 774 and 776. In sub-step 774, the first mode, e.g., first classification model, is deployed in a communications network, e.g., a second communications network. In sub-step 776, the second model, e.g., second classification model, is deployed in a communications network, e.g., a second communications network. Operation proceeds form step 772 to step 779.

In step 778, at least one of the one or more deployed models is used to identify communications by type (e.g., first type or not first type of communication) in the communications network in which it is deployed, e.g., the second communications network. In some embodiments, step 776 includes one or more sub-step 780, 782, and 784. In sub-step 780, the deployed first mode (e.g., first classification model) is used to identify communications of the first type (e.g., undesired communications) in the communications network in which it is deployed, e.g., the second communications network. In sub-step 782, the deployed second model (e.g., second classification model) is used to identify communications which are not of the first type (e.g., desired communications) in the communications network in which it is deployed (e.g., the second communications network). In sub-step 784, the deployed second model is used to identify communications of the first type in the communication network it is deployed, e.g., the second communications network. This can be achieved by determining that a communication that is not identified by the second model as not of the first type (e.g., not identified as desired) is of the first type (undesired). Similarly, communications not identified by the first classification as being of the first type (e.g., undesired) are not first type communications (e.g., not undesired communications). In some embodiments, said first classification model is based on non-media features (e.g., signaling related features such as source address, source identifier, calling party name, calling party number, source identifier, calling party country of origin, time of day) included in said balanced set of communications media fingerprints and corresponding communications information. In some embodiments, the first classification model is not based on features included in the media included in a communication and thus does not require the examination or use of communications media to determine whether a communication is of a first type (e.g., an undesired) communication.

Operation proceeds from step 778 to step 786.

In step 786, one or more communications identified as being of the first type (e.g., undesired) by one or more of the deployed one or more models is blocked from completing to an intended destination. In some embodiments step 786 includes sub-step 788. In sub-step 788, one or more communications identified as being of the first type (e.g., undesired) using the deployed first model, e.g., first classification model, is blocked from completing to an intended destination. Operation proceeds from step 786 via connection node E 790 to steps 706 shown on FIG. 7A and step 722 shown on FIG. 7B where the steps of the method are repeated.

In various embodiments, the first communications network and the communications network in which the one or more generated models (e.g., first classification model) is deployed are different communications networks. In some embodiments, the first communications network and the communications network in which one or more generated models (e.g., first classification model) is deployed are the same networks.

In some embodiments, the step of using the first classification model to identify communications of the first type (e.g., undesired communications) in the communications network in which the first classification model is deployed is performed in real time before the media corresponding to the communications identified as being of the first type (e.g., undesired communications) is delivered to a communications network user (e.g., individual to whom a call, SMS text message or Email communication is directed).

Figure 8:
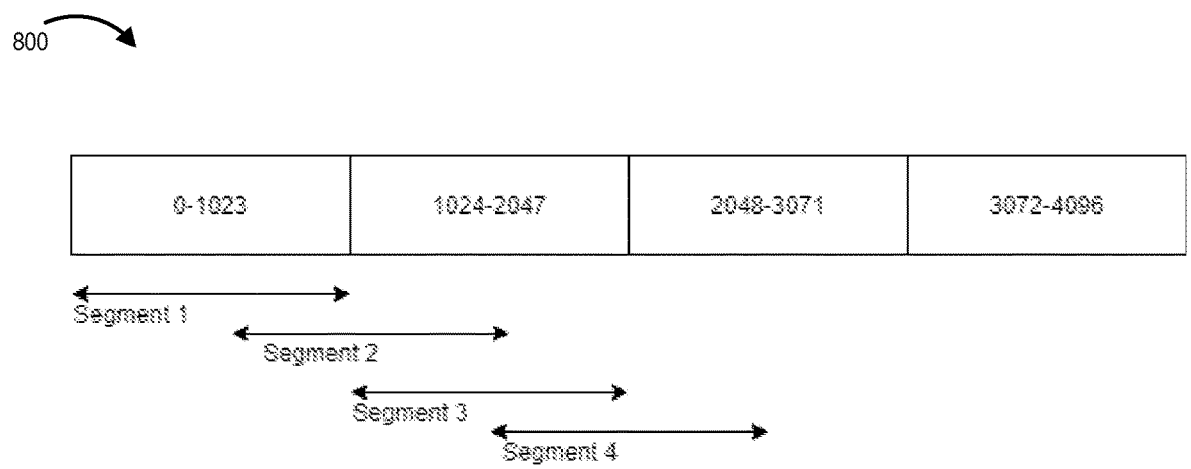
FIG. 8 illustrates segmenting media, e.g., speech, of a communication, e.g., a call.
Figure 9:
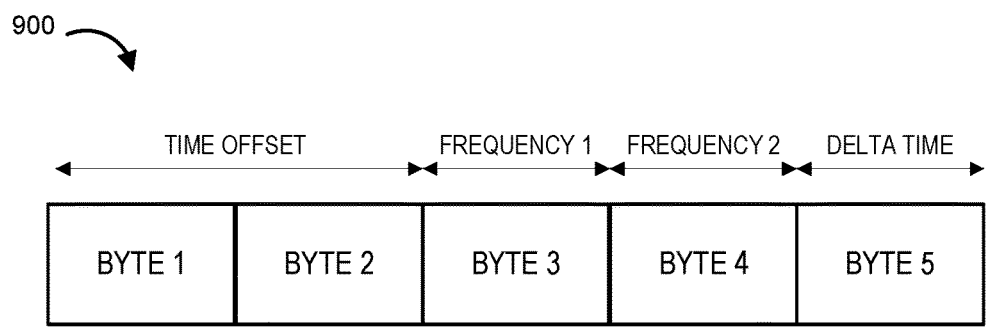
FIG. 9 illustrates the format of a media segment fingerprint.

In various embodiments, a communication media fingerprint for a communication, e.g., a call, is comprised of a set of a plurality of media segment fingerprints with each media fingerprint segment of the set corresponding to a different segment of the communications media, e.g., audio, corresponding to the communication, e.g., call. The segments may be, and sometimes are, overlapping communications media segments. In various embodiments, the communications media for example the audio of a call is received in a digitized encoded format. A portion of the communication's media, e.g., the first 30 seconds of a call, is segmented into a plurality of overlapping segments. To generate a media fingerprint segment the digitized and encoded speech is decoded and converted to an 8 KHz digital speech signal. Within this segment sub-segments which are silence of a particular duration are removed. A discrete Fourier transform is performed on speech signal of the segment. The peak frequencies or dominant frequencies by power spectral density are determined and the locations of the peak frequencies or dominant frequencies are determined as time offset values. A media fingerprint segment is then represented as time offset from beginning of audio, e.g., the beginning of the first 40 seconds, to the first peak frequency of the segment, a second peak frequency, and the time difference between the first peak frequency and the second peak frequency. In this case two dominant peak frequencies in each segment are used. Each segment may be 10 seconds of speech. There is a 50% overlap of segments. There are 4 segment media fingerprint which makes up the communications media fingerprint for the call which is 40 seconds. The segment size of 10 seconds was only chosen for exemplary purposes to simplify the explanation; the segment size is variable but is typically much smaller. A fingerprint locale in some embodiments is generated by varying one or more of the peak frequencies in a segment fingerprint, for example by +/−1 Hz. For example, an original media segment fingerprint of time offset, frequency 1, frequency 2, delta time between frequency 1 and frequency 2 becomes fuzzy segment fingerprint time offset, frequency 1+1 Hz, frequency 2, delta time between frequency 1 and frequency 2 where the variation is of the first frequency by +1 Hz. Diagram 800 of FIG. 8 illustrates segmenting of digital audio with a 50% overlap. Diagram 900 of FIG. 9 illustrates the format of an exemplary media fingerprint for a segment of audio of a communication wherein the time offset is stored in two bytes of data, the first and second frequencies are each stored as a single byte of data, and the delta offset is stored as a single byte of data. In some embodiments, two communications media fingerprints are determined to be a match when a first threshold number of segment fingerprints making up the communications media fingerprints match, e.g., 70% of the segment fingerprints of two different communications media fingerprints match.

Figure 4:
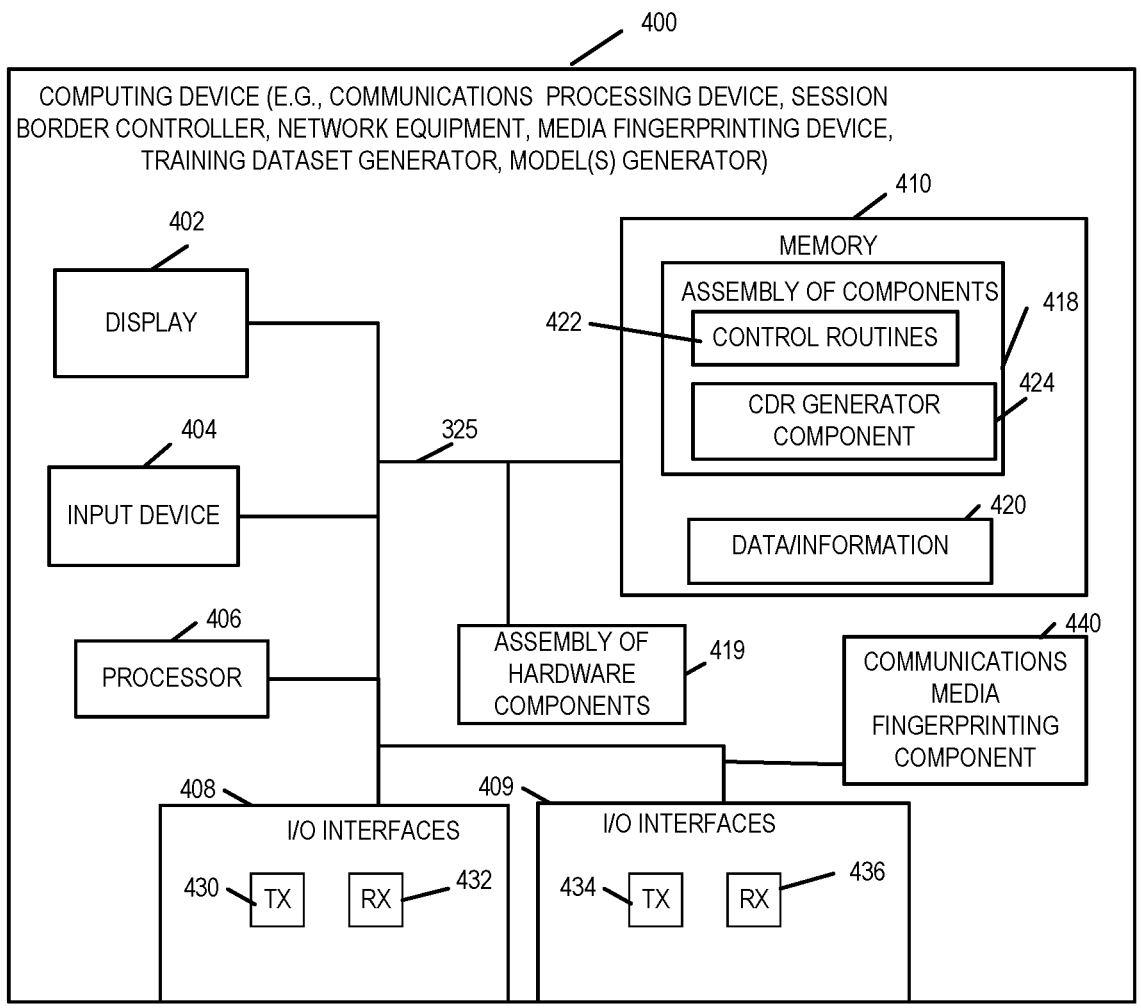
FIG. 4 illustrates an exemplary computing device (e.g., a communications processing device (e.g., Session Border Controller), a training data set generator, model(s) generator, a media fingerprinting device), in accordance with an embodiment of the present invention.

FIG. 4 illustrates an exemplary computing device 400 (e.g., Session Border Controller (SBC), PBX, training dataset generator, media fingerprinting device, model(s) generator, network equipment device), that performs among other things communications, e.g., call, media fingerprinting and analysis and communications processing. For the sake of simplicity, the computing device 400 is explained using an exemplary embodiment where the computing 400 is a Session Border Controller (SBC). However, it should be understood that the invention is not limited to the computing device of the invention being an SBC. For example, the computing device 400 can, and in some embodiments is, a media gateway, model generator, telecommunications/network switching equipment, or a training dataset generator. Exemplary computing device 400 includes an optional display 402, an input device 404, a processor 406, e.g., a CPU, I/O interfaces 408 and 409, which couple the computing device 400 to networks or communications links and/or various other devices, memory 410, and an assembly of hardware components 419, e.g., circuits corresponding to different components and/or modules, and a communications media fingerprinting component 440 coupled together via a bus 425 over which the various elements may interchange data and information. In some embodiments, the communications media fingerprinting component is implemented as a software component or module or a hardware component or a combination of software and hardware components. Memory 410 includes an assembly of components 418, e.g., an assembly of software components, and data/information 420. The assembly of software components 418 includes a control routines component 422 which includes software instructions which when processed and executed by processor 406 control the operation of the computing device 400 to perform various functions and/or one or more steps of the various method embodiments of the invention. The assembly of components also includes a communications detail record generator component 424 which generates communications detail records from information corresponding to communications, e.g., VOIP calls, passing through, established by and/or monitored by the communications processing device 100. The I/O interface 408 includes transmitters 430 and receivers 432. The I/O interface 409 includes transmitters 434 and receivers 436. The I/O interfaces are hardware interfaces including hardware circuitry. The computing device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP), Session Description Protocol (SDP), Real-time Transport Protocol (RTP), and RTP Control Protocol (RTCP). In some embodiments, the SBC device 100 includes a communication component configured to operate using IP, TCP, UDP, SDP and SIP protocol signaling methods. One or more of the I/O interfaces also support public switched telephone network and Integrated Services Digital Network (ISDN) connections and protocols such as for example, T1/E1 connections, BRI connections, ISDN protocol, etc. In some embodiments, the communications component is a hardware component, a software component or a component including hardware and software components. The communications media fingerprinting component is used to generate and analyze media, e.g., digital audio of a voice call, received by the computing device 400. In some embodiments, the training dataset generator 350, network equipment 303, PBX 320, SBC 314, training dataset generator 1010, communications processing device 1 1002, communications processing device 2 1004, model(s) generator 1014 are implemented in accordance with the computing device 400.

Figure 5:
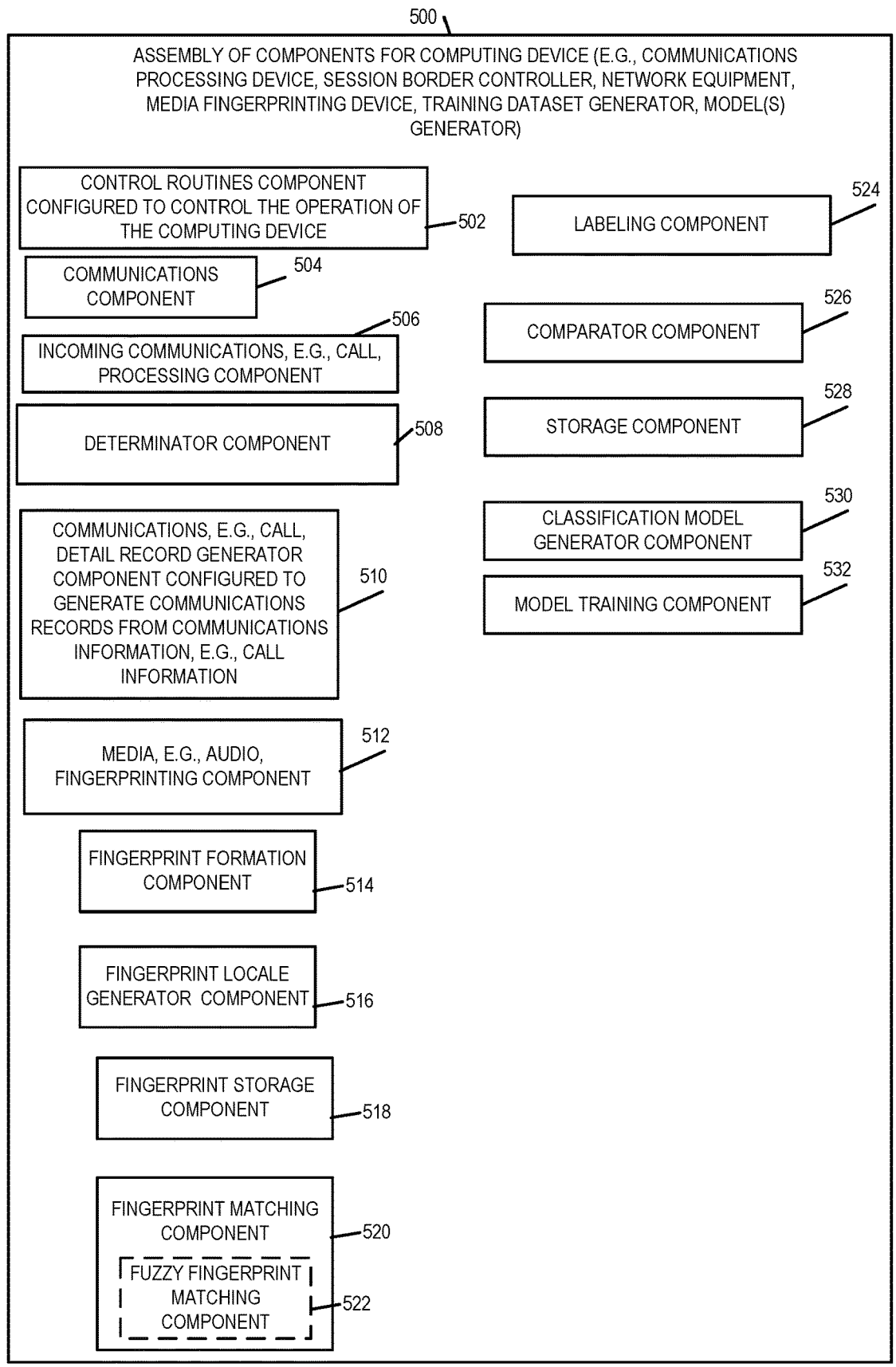
FIG. 5 illustrates an exemplary assembly of components for a computing device, (e.g., a communications processing device (e.g., Session Border Controller), a training data set generator, model(s) generator, a media fingerprinting device), in accordance with an embodiment of the present invention.

An exemplary assembly of components 500 for a communications processing device in accordance with an embodiment of the present invention is illustrated in FIG. 5. One or more of the assembly of components may be implemented as hardware components in the assembly of hardware components 419 or as software components in the assembly of software components 418 stored in memory 410 of the exemplary computing device 400.

FIG. 5 as discussed above is a drawing illustrating an assembly of components 500 which may be included in an exemplary communications processing device, e.g., computing device 400 of FIG. 4. Assembly of components 500 can be, and in some embodiments is, used in computing device 400. The components in the assembly of components 500 can, and in some embodiments are, implemented fully in hardware within the processor 406, e.g., as individual circuits. The components in the assembly of components 500 can, and in some embodiments are, implemented fully in hardware within the assembly of components 419, e.g., as individual circuits corresponding to the different components. In other embodiments some of the components are implemented, e.g., as circuits, within the processor 406 with other components being implemented, e.g., as circuits within assembly of components 419, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 410 of the computing device 400, with the components controlling operation of computing device 400 to implement the functions corresponding to the components when the components are executed by a processor, e.g., processor 406. In some such embodiments, the assembly of components 500 is included in the memory 410 as assembly of components 418. In still other embodiments, various components in assembly of components 500 are implemented as a combination of hardware and software, e.g., with another circuit external to the processor providing input to the processor 406 which then under software control operates to perform a portion of a component's function. While shown in the FIG. 4 embodiment as a single processor, e.g., computer, it should be appreciated that the processor 406 may be implemented as one or more processors, e.g., computers.

When implemented in software the components include code, which when executed by the processor 406, configure the processor 406 to implement the function corresponding to the component. In embodiments where the assembly of components 500 is stored in the memory 410, the memory 410 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the computing device 400 or elements therein such as the processor 406, to perform the functions of corresponding steps illustrated and/or described in the methods described herein and in one or more of the flowcharts of FIGS. 2, 6, 7 and/or described with respect to any of the Figures. Thus, the assembly of components 500 includes various components that perform functions of corresponding steps of FIGS. 2, 6 and 7.

Assembly of components 500 includes the following components: a control routines component 502, a communications component 504, an incoming communications, e.g., call, processing component 506, a determinator component 508, a communications, e.g., call, detail record generator component 510, a media fingerprinting component 512, fingerprint formation component 514, a fingerprint local generator component 516, a fingerprint storage component 518, a fingerprint matching component 520 which in some embodiments includes a fuzzy fingerprint matching component 522, a labeling component 524, a comparator component 526, a storage component 528, a classification model generator component 530, and a model training component 532. The control routines component 502 is configured to control the operation of the communications processing device. The communications component 504 is configured to provide communications functionality including communications signaling and support for various communications protocols and interfaces. The incoming communications processing component 506 is configured to provide processing for incoming communications, e.g., calls, including dropping identified robocalls or taking other call handling actions with respect to identified robocalls. The determinator component 508 is configured to make determinations for the communications processing device, e.g., if a fingerprint being analyzed matches a stored robocall fingerprint.

The communications, e.g., call detail record generator component 510 is configured to generate communication, e.g., call, detail records from communication, e.g., call, information.

The media, e.g., call audio, fingerprinting component 512 is configured to generate and process media fingerprints including generating fuzzy fingerprints, matching of fingerprints, generation of fingerprint locales.

The fingerprint formation component 514 forms/generates/creates fingerprints, e.g., media communications fingerprints, fingerprint-sets, fuzzy fingerprints. In some embodiments, the fingerprint formation component 514 is a sub-component of media fingerprinting component 512.

The fingerprint locale generator component 516 generates a set of fuzzy fingerprints from a base fingerprint. In some embodiments, the fingerprint locale generator component 516 is a sub-component of the media fingerprinting component 512.

The fingerprint storage component 518 performs formatting, storage, and retrieval of fingerprints to/from memory and/or database systems. In some embodiments, fingerprint storage component 518 is a sub-component of media fingerprinting component 512.

The fingerprint matching component 520 performs operations to determine if fingerprints match. In some embodiments, fingerprint matching component 520 includes fuzzy fingerprint matching component 522 which performs fuzzy matching of fingerprints. In some embodiments, fingerprint matching component 520 is a sub-component of media fingerprinting component 512.

The labeling component 524 labels data such as for example communications and/or media fingerprints.

The comparator component 526 performs comparisons for example of data such as media fingerprints and/or communications data, e.g., signaling data from communications records.

The storage component 528 performs storage and retrieval of information and data to and from memory, storage devices, databases, such as for example media fingerprints, communications records, trace records, training data sets, labelled data.

The classification model generator component 530 generates classification models.

The model training component 532 trains model, e.g., classification models, utilizing label training data sets.

As explained above, various devices may be implemented in accordance with computing device 400 such as for example network equipment device 303, communications processing device 1 1002, communications processing device 2 1004, training data set generator 350, training data set generator 1010, model(s) generator 1014 and as such the specific components in the assembly of components 500 included and/or utilized by a device will vary with some devices including some of the above described components which are not included with other devices.

While the invention has been explained in terms of a communication which is a telephone call and the communications media being the audio of the call, the invention is not so limited but is applicable to other types of communications such as SMS messages, text messages, e-mails, video messaging, and other types of media such as, for example, text, images, video, video, and audio. Furthermore, while the example of generating training data for robocalls using communications media fingerprints robocalls are only one type of communication, the invention is applicable to other types of communications which have common characteristics and for which a infrastructure or capture system such as the honeypot infrastructure/system can capture communications having a high probability of the being of the same type that can be used to generate automatically labeled data of the type to which the shared characteristics correspond.

Various embodiments of the invention overcome the problems and issues described above. Various embodiments in accordance with the present invention utilize and/or require the following: (a) a list of identifying information for likely robocalls over a sampling period of time, (b) a set of all media fingerprint locales for the likely robocalls, (c) a corpus of calls with associated identifying information and media fingerprint, (d) a reasonably large number of robocalls in the corpus. Items (a) and (b) are met by the honeypot implemented for an enterprise customer or a carrier. Sufficient sampling here is a function of both the number of telephone numbers allocated to the honeypot system and the period of time over which data is collected. The latter can be adjusted based on the former to achieve sufficient cardinality. Item (c) may be, and in some embodiments is, implemented by an SBC CDR and the TRC media fingerprinting functionality and/or by another communications processing device such as for example a media gateway. Item (d) is easily met given the robocalling characteristics currently. Estimates range from 1 in 10 to 1 in 5 communications, e.g., calls, are a robocall. Robocalls are not by any means rare events.

One might question the practicality of using an SBC communications media fingerprinting feature/functionality when the sampling is so sparse in the TRC (0.5% of calls randomly sampled). However, the sheer volume of calls in a typical tier 2 or tier 1 carrier guarantees a corpus with a significant number of robocalls to be tagged. As an example, consider a carrier terminating just 100M calls per week. Using the sampling of 1 in 200, and a robocall ratio of 1 in 10, this weekly sample can be expected to contain 50K robocalls. Since rule of thumb suggests 10X samples per model parameter, this would allow building a 5000 parameter model, a reasonably large classification model.

Implementation of the present invention when applied to robocall communications result in a robocall training data set that: (1) has a large number of (labeled) robocalls, (2) is relatively balanced between positive and negatives, (3) has the full feature set associated with calls. These are all characteristics of a good training set. Furthermore, the method is robust. Many characteristics of a robocall are spoofed to avoid detection. But robocallers can't (completely) change the media because that is their message. Hence the labeling will likely be more accurate than alternatives based on other call characteristics. Additionally, a natural consequence of using this method for labeling and then building a normalized model is that the characteristics which are spoofed will be non-predictive and drop out.

The communications processing device and/or the fingerprinting generation and processing operations described herein may be, and in some embodiments are, implemented on a compute node in the cloud, the compute node including a processor. The, the processor being coupled to memory. In some embodiments, each of the devices, systems and/or nodes described herein are implemented by a system including one or more processors and memory, the memory including instructions which when executed by the one or more processors control the operation of the system.

In some embodiments, the communications processing device and/or fingerprinting generation and processing operation described herein are implemented using network function virtualization.

Various embodiments of the present invention will now be discussed.

Listing of First Set of Method Embodiments:

Method Embodiments 1. A method of processing communications (e.g., calls, SMS messages, etc.), comprising: generating (203), at a first fingerprinting device, communications media fingerprints for at least some communications (e.g., voice calls, SMS message) passing through a first communications network, said communications media fingerprints generated by the first fingerprinting device being a first set (204) of communications media fingerprints; generating (210) a first set (212) of communications media fingerprints and corresponding communications information (e.g., CDR information) including a plurality of communications media fingerprints from said first set of communications media fingerprints (202) and corresponding communications information (e.g., CDR) by associating individual communications media fingerprints in said first set of communications media fingerprints with corresponding communications information (e.g., each entry or record in the first set of communications media fingerprints and corresponding information including a communications media fingerprint and corresponding CDR information for the communication to which the communications media fingerprint corresponds where the CDR information is from a first set of communications data records 208); generating (218) from unsolicited communications (e.g., communications (217) received in a honey pot) a set (224) of undesired communications media fingerprints, said set (224) of undesired communications media fingerprints (224) being a second set of communications media fingerprints; and labeling (228) individual fingerprints in said first set (212) of communications media fingerprints and corresponding communications information, said step (228) of labeling including labeling communications media fingerprints in said first set (212) of communications media fingerprints and corresponding communications information as being undesired when the individual communications media fingerprint being labeled matches a communications media fingerprint in said set of undesired communications media fingerprints.

Method Embodiment 1A. The method of Method Embodiment 1, further comprising: generating (206) communications data records (e.g., CDRs) for communications passing through the communications network, at least some of said communications records corresponding to communications for which communications media fingerprints were generated by said first fingerprinting device.

Method Embodiment 1B. The method of Method Embodiment 1A, wherein said communications data records include signaling information for individual communications and wherein generating the first set (212) of communications media fingerprints and corresponding communications information includes associating individual call data records with corresponding communications media fingerprints to generate entries in said first set (212) of communications media fingerprints and corresponding communications information, each entry including a communications media fingerprint and corresponding communications information from the communication to which the entry corresponds (e.g., in first set 212 of communications media fingerprints and corresponding communications information record 1 includes the communications media fingerprint for communications 1 and corresponding communications data record information for communications 1; record 2 includes the communications media fingerprint for communications 2 and corresponding communications data record information for communications 2; and so on)

Method Embodiment 2. The method of Method Embodiment 1, further comprising: comparing (227) (e.g., before said step 228 of labeling) individual communications media fingerprints in said first set (212) of communications media fingerprints and corresponding communications information to communications media fingerprints in said set of undesired communications media fingerprints to identify communications media fingerprints in said first set (212) of communications media fingerprints and corresponding communications information that match a communications media fingerprint (e.g., any individual one of the communications media fingerprints) in said set of undesired communications media fingerprints.

Method Embodiment 3. The method of Method Embodiment 2, wherein said step (228) of labeling (228) individual communications media fingerprints in said first set (212) of communications media fingerprints includes labeling communications media fingerprints in said first set of communications media fingerprints and corresponding communications information as being not undesired communications media fingerprints when the individual communications media fingerprint being labeled does not match a communications media fingerprint in said set of undesired communications media fingerprints.

Method Embodiment 4. The method of Method Embodiment 3, further comprising: selecting (248) a balanced set of communications media fingerprints and corresponding communications information by: i) selecting some labeled undesired communications media fingerprints and corresponding communications information, and ii) selecting some labeled desired communications media fingerprints and corresponding communications information; and storing (249) the selected balanced set of communications media fingerprints and corresponding communications information as a set (250) of automatically generated and labeled training data including communications media fingerprints of both desired communications and undesired communications.

Method Embodiment 5. The method of Method Embodiment 4, further comprising: dividing (240), prior to selecting the balanced set of communications media fingerprints, communications media fingerprints and corresponding communications information into a labeled set (242) of undesired communications media fingerprints and corresponding communications information and a labeled set (244) of desired communications media fingerprints and corresponding communications.

Method Embodiment 6. The method of Method Embodiment 5, wherein selecting (248) a balanced set (250) of communications media fingerprints and corresponding communications information includes selecting equal or near equal numbers of communications media fingerprints and corresponding communications information from the labeled set (242) of undesired communications media fingerprints and corresponding communications information and the labeled set (244) of desired communications media fingerprints and corresponding communications.

Method Embodiment 6A. The method of Method Embodiment 6, wherein the labeled set (244) of desired communications media fingerprints and corresponding communications information includes more records (e.g., 10 times or some other multiple) than the labeled set (242) of undesired communications media fingerprints; and wherein the balanced set (250) of communications media fingerprints and corresponding communications information includes an equal or near equal number of records corresponding to desired communications and undesired communications.

Method Embodiment 7. The method of Method Embodiment 6, further comprising: performing one or more classification model training operations (251) using said balanced set (250) of communications media fingerprints and corresponding communications information as a labeled set of communications training data to generate one or more models used to distinguish between desired communications and undesired communications.

Method Embodiment 8. The method of Method Embodiment 7, wherein said step (251) of performing one or more classification model training operations includes generating (253) at least a first classification model that determines whether a communication is an undesired communication.

Method Embodiment 8A. The method of Method Embodiment 8, wherein said first classification model is based on non-media features (e.g., signaling related features such as source address, source identifier, calling party name, calling party number, source identifier, calling party country of origin, time of day, SIP user agent content, ingress trunk group, egress trunk group) included in said balanced set (250) of communications media fingerprints and corresponding communications information.

Method Embodiment 8B. The method of Method Embodiment 8A, wherein said first classification model is not based on features included in the media included in a communication and thus does not require the examination or use of communications media to determine whether a communication is an undesired communication.

Method Embodiment 8C. The method of Method Embodiment 8, wherein said first step of performing one or more classification model training operations includes generating a second classification model that determines whether a communication is a desired communication.

Method Embodiment 9. The method of Method Embodiment 8, further comprising: deploying (254) the generated first classification model in a second communications network; and using (258) the deployed first classification model to identify undesired communications in the communications network in which the first classification model is deployed.

Method Embodiment 9A. The method of Method Embodiment 9, wherein using the first classification model (258) to identify undesired communications in the second communications network in which the first classification model is deployed is performed in real time before the media corresponding to the communications identified as undesired communications is delivered to a communications network user (e.g., individual to whom a call or Email communication is directed).

Method Embodiment 9B. The method of Method Embodiment 9, wherein said first communications network and said second communications network are different communications networks.

Method Embodiment 10. The method of Method Embodiment 9, further comprising: blocking (266) one or more undesired communications identified using the deployed first classification model from completing to an intended destination.

Listing of First Set of System Embodiments:

System Embodiment 1. A system of processing communications (e.g., calls, SMS messages, etc.), comprising: a first communications processing device including: memory; and a first processor, said first processor controlling the first communications processing device to perform the following operations: generating (203), at the first communications processing device, communications media fingerprints for at least some communications (e.g., voice calls, SMS message) passing through a first communications network, said communications media fingerprints generated by the first communications processing device being a first set (204) of communications media fingerprints; generating (210) a first set (212) of communications media fingerprints and corresponding communications information (e.g., CDR information) including a plurality of communications media fingerprints from said first set of communications media fingerprints and corresponding communications information (e.g., CDR) by associating individual communications media fingerprints in said first set of communications media fingerprints with corresponding communications information (e.g., each entry or record in the first set of communications media fingerprints and corresponding information including a communications media fingerprint and corresponding CDR information for the communication to which the communications media fingerprint corresponds where the CDR information is from a first set of communications data records 208); generating (218) from unsolicited communications (e.g., communications (217) received in a honey pot) a set (224) of undesired communications media fingerprints, said set (224) of undesired communications media fingerprints being a second set of communications media fingerprints; and labeling (228) individual fingerprints in said first set (212) of communications media fingerprints and corresponding communications information, said step (228) of labeling including labeling communications media fingerprints in said first set (212) of communications media fingerprints and corresponding communications information as being undesired when the individual communications media fingerprint being labeled matches a communications media fingerprint in said set of undesired communications media fingerprints.

System Embodiment 1A. The system of System Embodiment 1, wherein the first processor controls the first communications processing device to perform the following operation: generating (206) communications data records (e.g., CDRs) for communications passing through the communications network, at least some of said communications records corresponding to communications for which communications media fingerprints were generated by said first communications processing device.

System Embodiment 1A1. The system of System Embodiment 1, wherein said first communications processing device is a first fingerprinting device.

System Embodiment 1B. The system of System Embodiment 1A, wherein said communications data records include signaling information for individual communications and wherein generating the first set (212) of communications media fingerprints and corresponding communications information includes associating individual call data records with corresponding communications media fingerprints to generate entries in said first set (212) of communications media fingerprints and corresponding communications information, each entry including a communications media fingerprint and corresponding communications information from the communication to which the entry corresponds (e.g., in first set 212 of communications media fingerprints and corresponding communications information record 1 includes the communications media fingerprint for communications 1 and corresponding communications data record information for communications 1; record 2 includes the communications media fingerprint for communications 2 and corresponding communications data record information for communications 2; and so on)

System Embodiment 2. The system of System Embodiment 1, wherein the first processor controls the first communications processing device to perform the following operation: comparing (227) (e.g., before said step 228 of labeling) individual communications media fingerprints in said first set (212) of communications media fingerprints and corresponding communications information to communications media fingerprints in said set of undesired communications media fingerprints to identify communications media fingerprints in said first set (212) of communications media fingerprints and corresponding communications information that match a communications media fingerprint (e.g., any individual one of the communications media fingerprints) in said set of undesired communications media fingerprints.

System Embodiment 3. The system of System Embodiment 2, wherein said step (228) of labeling (228) individual communications media fingerprints in said first set (212) of communications media fingerprints includes labeling communications media fingerprints in said first set of communications media fingerprints and corresponding communications information as being not undesired communications media fingerprints when the individual communications media fingerprint being labeled does not match a communications media fingerprint in said set of undesired communications media fingerprints.

System Embodiment 4. The system of System Embodiment 3, wherein the first processor controls the first communications processing device to perform the following operations: selecting (248) a balanced set of communications media fingerprints and corresponding communications information by: i) selecting some labeled undesired communications media fingerprints and corresponding communications information, and ii) selecting some labeled desired communications media fingerprints and corresponding communications information; and storing (249) the selected balanced set of communications media fingerprints and corresponding communications information as a set (250) of automatically generated and labeled training data including communications media fingerprints of both desired communications and undesired communications.

System Embodiment 5. The system of System Embodiment 4, wherein the first processor controls the first communications processing device to perform the following operation: dividing (240), prior to selecting the balanced set of communications media fingerprints, communications media fingerprints and corresponding communications information into a labeled set (242) of undesired communications media fingerprints and corresponding communications information and a labeled set (244) of desired communications media fingerprints and corresponding communications.

System Embodiment 6. The system of System Embodiment 5, wherein selecting (248) a balanced set (250) of communications media fingerprints and corresponding communications information includes selecting equal or near equal numbers of communications media fingerprints and corresponding communications information from the labeled set (242) of undesired communications media fingerprints and corresponding communications information and the labeled set (244) of desired communications media fingerprints and corresponding communications.

System Embodiment 6A. The system of System Embodiment 6, wherein the labeled set (244) of desired communications media fingerprints and corresponding communications information includes more records (e.g., 10 times or some other multiple) than the labeled set (242) of undesired communications media fingerprints; and wherein the balanced set (250) of communications media fingerprints and corresponding communications information includes an equal or near equal number of records corresponding to desired communications and undesired communications.

System Embodiment 7. The system of System Embodiment 6, wherein the first processor controls the first communications processing device to perform the following operation: performing one or more classification model training operations (251) using said balanced set (250) of communications media fingerprints and corresponding communications information as a labeled set of communications training data to generate one or more models used to distinguish between desired communications and undesired communications.

System Embodiment 8. The system of System Embodiment 7, wherein said step (251) of performing one or more classification model training operations includes generating (253) at least a first classification model that determines whether a communication is an undesired communication.

System Embodiment 8A. The system of System Embodiment 8, wherein said first classification model is based on non-media features (e.g., signaling related features such as source address, source identifier, calling party name, calling party number, source identifier, calling party country of origin, time of day, SIP user agent content, ingress trunk group, egress trunk group) included in said balanced set (250) of communications media fingerprints and corresponding communications information.

System Embodiment 8B. The system of System Embodiment 8A, wherein said first classification model is not based on features included in the media included in a communication and thus does not require the examination or use of communications media to determine whether a communication is an undesired communication.

System Embodiment 8C. The system of System Embodiment 8, wherein said step of performing one or more classification model training operations includes generating a second classification model that determines whether a communication is a desired communication.

System Embodiment 9. The system of System Embodiment 8, wherein the first processor controls the first communications processing device to perform the following operations: deploying (254) the generated first classification model in a second communications network; and using (258) the deployed first classification model to identify undesired communications in the communications network in which the first classification model is deployed.

System Embodiment 9A. The system of System Embodiment 9, wherein using the first classification model (258) to identify undesired communications in the second communications network in which the first classification model is deployed is performed in real time before the media corresponding to the communications identified as undesired communications are delivered to a communications network user (e.g., individual to whom a call or Email communication is directed).

System Embodiment 9B. The system of System Embodiment 9, wherein said first communications network and said second communications network are different communications networks.

System Embodiment 10. The system of System Embodiment 9, wherein the first processor controls the first communications processing device to perform the following operation: blocking (266) one or more undesired communications identified using the deployed first classification model from completing to an intended destination.

Listing of Second Set of Method Embodiments:

Method Embodiment 1. A method of processing communications (e.g., calls, SMS messages, etc.) comprising: generating from a first plurality of communications passing through a first communications network a first set of communications media fingerprints and corresponding communications information (e.g., CDR information), said communications media fingerprints included in said first set of communications media fingerprints and corresponding communications information being a first set of communications media fingerprints; generating from a second plurality of communications (e.g., unsolicited communications received in a honey pot) a set of communications media fingerprints of a first type, said set of communications media fingerprints of a first type (e.g., undesired media communications type) being a second set of communications media fingerprints, (e.g., a set of reliably labeled undesired communications media fingerprints) each individual communication of said second plurality of communications having characteristics indicating a probability greater than a first threshold (e.g., a high probability such as 90%) that the individual communication is of said first type; labeling individual communications media fingerprints in said first set of communications media fingerprints and corresponding communications information, said step of labeling including labeling communications media fingerprints in said first set of communications media fingerprints and corresponding communications information as being of said first type (e.g., undesired communication) when the individual communications media fingerprint being labeled matches a communications media fingerprint in said first set of communications media fingerprints of said first type.

Method Embodiment 1A1. The method of Method Embodiment 1, wherein each entry in the first set of communications media fingerprints and corresponding communications information includes a communications media fingerprint and corresponding communication information for an individual communication.

Method Embodiment 1A2. The method of Method Embodiment 1, wherein each entry in the first set of communications media fingerprints and corresponding information is stored in a record.

Method Embodiment 1A3. The method of Method Embodiment 1A1, wherein said communications information for an individual communication includes one or more of the following: communication source identifier (e.g., calling party name, calling party number), communication destination identifier (e.g., called party name, called party number), communication source IP address, communication destination IP address, communication start time, communication completion or termination time, media type (audio call, video call, audio/video call, e-mail, text message, SMS message), SIP-User-Agent content, Via header content and format, ingress trunk group, egress trunk group, geographical location information for origin of communication, geographical destination information for destination of communication, area code and/or country code of origin of communication, area code and/or country code of destination of communication, etc.

Method Embodiment 1B. The method of Method Embodiment 1, wherein said first plurality of communications are telephone calls; wherein said second plurality of communications are telephone calls; wherein said first type is an undesired communication (e.g., a robocall); and wherein said characteristics indicating a probability greater than a first threshold that the individual communication is of said first type include: (i) the communication is a telephone call, and (ii) that the communication is directed to an unused destination telephone number.

Method Embodiment 1C. The method of Method Embodiment 1, further comprising: operating a communications capture system (e.g., honeypot) that captures communications having characteristics indicating a probability greater than a first threshold (e.g., a high probability such as 90%) that the individual communication is of said first type.

Method Embodiment 2. The method of Method Embodiment 1, wherein said generating from a first plurality of communications passing through a first communications network a first set of communications media fingerprints and corresponding communications information (e.g., CDR information) includes: generating, at a first fingerprinting device, said first set of communications media fingerprints.

Method Embodiment 3. The method of Method Embodiment 2, wherein said generating from a first plurality of communications passing through a first communications network a first set of communications media fingerprints and corresponding communications information (e.g., CDR information) includes: associating individual communications media fingerprints in said first set of communications media fingerprints with corresponding communications information (e.g., each entry or record in the first set of communications media fingerprints and corresponding information including a communications media fingerprint and corresponding CDR information for the communication to which the communications media fingerprint corresponds where the CDR information is from a first set of communications data records).

Method Embodiment 3A. The method of Method Embodiment 3, further comprising: generating communications data records (e.g., CDRs) for communications passing through the first communications network, at least some of said communications data records corresponding to communications for which communications media fingerprints were generated by said first fingerprinting device.

Method Embodiment 3B. The method of Method Embodiment 3A, wherein said communications data records include signaling information for individual communications and wherein generating the first set of communications media fingerprints and corresponding communications information includes associating individual call data records with corresponding communications media fingerprints to generate entries in said first set of communications media fingerprints and corresponding communications information, each entry including a communications media fingerprint and corresponding communications information from the communication to which the entry corresponds (e.g., in first set of communications media fingerprints and corresponding communications information record 1 includes the communications media fingerprint for communications 1 and corresponding communications data record information for communications 1; record 2 includes the communications media fingerprint for communications 2 and corresponding communications data record information for communications 2; and so on)

Method Embodiment 4. The method of Method Embodiment 1, wherein said generating from a second plurality of communications (e.g., unsolicited communications received in a honey pot) a set of communications media fingerprints of a first type includes: (i) generating media fingerprint locales for one or more of the communications media fingerprints of the second set of communications media fingerprints, each of said generated media fingerprint locales including a set of communications media fingerprints based on media from a single communication from the second plurality of communications.

Method Embodiment 4A. The method of Method Embodiment 4, wherein for communications with media which is audio said generating media fingerprint locales for one or more of the communications media fingerprints of the second set of communications media fingerprints includes passing at least a first portion of an audio stream of a first communication from the second plurality of communications through different codecs as part of generating said media fingerprint locale for the first communications.

Method Embodiment 4B. The method of Method Embodiment 1, wherein communications media fingerprints for media which is audio is based on frequency characteristics extracted from the audio using digital signal processing.

Method Embodiment 5. The method of Method Embodiment 4, further comprising: comparing (e.g., before said step of labeling) individual communications media fingerprints in said first set of communications media fingerprints and corresponding communications information to communications media fingerprints in said set of communications media fingerprints of said first type to identify communications media fingerprints in said first set of communications media fingerprints and corresponding communications information that match a communications media fingerprint (e.g., any individual one of the communications media fingerprints) in said set of communications media fingerprints of said first type.

Method Embodiment 5A. The method of Method Embodiment 1, further comprising: comparing (e.g., before said step of labeling) individual communications media fingerprints in said first set of communications media fingerprints and corresponding communications information to communications media fingerprints in said set of communications media fingerprints of said first type to identify communications media fingerprints in said first set of communications media fingerprints and corresponding communications information that match a communications media fingerprint (e.g., any individual one of the communications media fingerprints) in said set of communications media fingerprints of said first type.

Method Embodiment 5B. The method of Method Embodiment 5A, wherein said match is an exact match or a fuzzy match.

Method Embodiment 5C. The method of Method Embodiment 5, wherein each of said communications which are included in said first plurality of communications is different than each of said communications which are included in said second plurality of communications (e.g., none of the communications, e.g., calls, which are included in the first plurality of communications are included in the second plurality of communications, e.g., because they are communications, e.g., calls, from non-overlapping time periods or different country regions).

Method Embodiment 5D. The method of Method Embodiment 5, wherein one or more of said communications which are included in said first plurality of communications is included in said second plurality of communications; wherein a first communication is included in said first plurality of communications and said second plurality of communications, said first communications being used to generate an entry in the first set of communications media fingerprints and an entry in the second set of communications media fingerprints.

Method Embodiment 6. The method of Method Embodiment 5, wherein said step of labeling individual communications media fingerprints in said first set of communications media fingerprints includes labeling communications media fingerprints in said first set of communications media fingerprints and corresponding communications information as being not first type (e.g., undesired) communications media fingerprints when the individual communications media fingerprint being labeled does not match a communications media fingerprint in said set of communications media fingerprints of the first type.

Method Embodiment 7. The method of Method Embodiment 6, further comprising: selecting a balanced set of communications media fingerprints and corresponding communications information by: i) selecting some labeled first type (e.g., undesired) communications media fingerprints and corresponding communications information, and ii) selecting some labeled not first type (e.g., desired) communications media fingerprints and corresponding communications information; and storing the selected balanced set of communications media fingerprints and corresponding communications information as a set of automatically generated and labeled training data including communications media fingerprints of both not first type (e.g., desired) communications and first type (e.g., undesired) communications.

Method Embodiment 8. The method of Method Embodiment 7, wherein said first type is undesired; wherein said not first type is desired; said method further comprising: dividing, prior to selecting the balanced set of communications media fingerprints, communications media fingerprints and corresponding communications information into a labeled set of first type (e.g., undesired) communications media fingerprints and corresponding communications information and a labeled set of not first type (e.g., desired) communications media fingerprints and corresponding communications; and wherein the labeled set of first type communications media fingerprints and corresponding communications information is a labeled set of undesired communications media fingerprints and corresponding communications information; and wherein the labeled set of not first type communications media fingerprints and corresponding communications is a labeled set of desired communications media fingerprints and correspond communications.

Method Embodiment 9. The method of Method Embodiment 8, wherein selecting a balanced set of communications media fingerprints and corresponding communications information includes selecting equal or near equal numbers of communications media fingerprints and corresponding communications information from the labeled set of undesired communications media fingerprints and corresponding communications information and the labeled set of desired communications media fingerprints and corresponding communications.

Method Embodiment 9A. The method of Method Embodiment 9, wherein the labeled set of desired communications media fingerprints and corresponding communications information includes more records (e.g., 10 times or some other multiple) than the labeled set of undesired communications media fingerprints; and wherein the balanced set of communications media fingerprints and corresponding communications information includes an equal or near equal number of records corresponding to desired communications and undesired communications.

Method Embodiment 10. The method of Method Embodiment 9, further comprising: performing one or more communications model training operations using said balanced set of communications media fingerprints and corresponding communications information as a labeled set of communications training data to generate one or more models used to distinguish between desired communications and undesired communications.

Method Embodiment 11. The method of Method Embodiment 10, wherein said step of performing one or more classification model training operations includes generating at least a first communications model corresponding to an undesired communications.

Method Embodiment 11A. The method of Method Embodiment 11, wherein said first classification model is based on non-media features (e.g., signaling related features such as source address, source identifier, calling party name, calling party number, source identifier, calling party country of origin, time of day) included in said balanced set of communications media fingerprints and corresponding communications information.

Method Embodiment 11B. The method of Method Embodiment 11A, wherein said first classification model is not based on features included in the media included in a communication and thus does not require the examination or use of communications media to determine whether a communication is an undesired communication.

Method Embodiment 11C. The method of Method Embodiment 11, wherein said step of performing one or more classification model training operations includes generating a second classification model corresponding to desired communications.

Method Embodiment 12. The method of Method Embodiment 11, further comprising: deploying the generated first classification model in a second communications network; and using the deployed model to identify undesired communications in the communications network in which the model is deployed.

Method Embodiment 12A. The method of Method Embodiment 12, wherein using the first classification model to identify undesired communications in the second communications network in which the model is deployed is performed in real time before the media corresponding to the communications identified as undesired communications is delivered to a communications network user (e.g., individual to whom a call or Email communication is directed).

Method Embodiment 12B. The method of Method Embodiment 12, wherein said first communications network and said second communications network are different communications networks.

Method Embodiment 13. The method of Method Embodiment 12, further comprising: blocking one or more undesired communications identified using the deployed first classification model from completing to an intended destination.

Method Embodiment 14. The method of Method Embodiment 1, wherein the first set of communications media fingerprints are not generated from recordings of media (e.g., they are generated in real-time).

Method Embodiment 15. The method of Method Embodiment 14, wherein the second set of communications media fingerprints is not generated from recordings of media.

Method Embodiment 16. The method of Method Embodiment 14, wherein the second set of communications media fingerprints are generated from recordings.

Method Embodiment 17. The method of Method Embodiment 1, wherein each communications media fingerprint of the first set of communications media fingerprints and the second set of communications media fingerprints is generated by using a non-invertible compression function on the media of the communication to which the communications media fingerprint corresponds.

Method Embodiment 18. The method of Method Embodiment 1, wherein media of a communication to which a communications media fingerprint corresponds can not be reconstructed from the communications media fingerprint.

Listing of Second Set of System Embodiments:

System Embodiment 1. A system of processing communications (e.g., calls, SMS messages, etc.) comprising: a first communications processing device, said first communications processing device including: a first memory; and a first processor, said first processor controlling the first communications processing device to perform the following operations: generating from a first plurality of communications passing through a first communications network a first set of communications media fingerprints and corresponding communications information (e.g., CDR information), said communications media fingerprints included in said first set of communications media fingerprints and corresponding communications information being a first set of communications media fingerprints; generating from a second plurality of communications (e.g., unsolicited communications received in a honey pot) a set of communications media fingerprints of a first type, said set of communications media fingerprints of a first type (e.g., undesired media communications type) being a second set of communications media fingerprints, (e.g., a set of reliably labeled undesired communications media fingerprints) each individual communication of said second plurality of communications having characteristics indicating a probability greater than a first threshold (e.g., a high probability such as 90%) that the individual communication is of said first type; labeling individual communications media fingerprints in said first set of communications media fingerprints and corresponding communications information, said step of labeling including labeling communications media fingerprints in said first set of communications media fingerprints and corresponding communications information as being of said first type (e.g., undesired communication) when the individual communications media fingerprint being labeled matches a communications media fingerprint in said set of communications media fingerprints of said first type.

System Embodiment 1A. The system of System Embodiment 1, wherein said first communications processing device is a first fingerprinting device.

System Embodiment 1A1. The system of System Embodiment 1, wherein each entry in the first set of communications media fingerprints and corresponding communications information includes a communications media fingerprint and corresponding communication information for an individual communication.

System Embodiment 1A2. The system of System Embodiment 1, wherein each entry in the first set of communications media fingerprints and corresponding information is stored in a record.

System Embodiment 1A3. The system of System Embodiment 1A1, wherein said communications information for an individual communication includes one or more of the following: communication source identifier (e.g., calling party name, calling party number), communication destination identifier (e.g., called party name, called party number), communication source IP address, communication destination IP address, communication start time, communication completion or termination time, media type (audio call, video call, audio/video call, e-mail, text message, SMS message), SIP-User-Agent content, Via header content and format, ingress trunk group, egress trunk group, geographical location information for origin of communication, geographical destination information for destination of communication, area code and/or country code of origin of communication, area code and/or country code of destination of communication, etc.

System Embodiment 1B. The system of System Embodiment 1, wherein said first plurality of communications are telephone calls; wherein said second plurality of communications are telephone calls; wherein said first type is an undesired communication (e.g., a robocall); and wherein said characteristics indicating a probability greater than a first threshold that the individual communication is of said first type include: (i) the communication is a telephone call, and (ii) that the communication is directed to an unused destination telephone number.

System Embodiment 1C. The system of System Embodiment 1, further comprising: a communications capture system (e.g., honeypot) that captures communications having characteristics indicating a probability greater than a first threshold (e.g., a high probability such as 90%) that the individual communication is of said first type.

System Embodiment 2. The system of System Embodiment 1, wherein said generating from a first plurality of communications passing through a first communications network a first set of communications media fingerprints and corresponding communications information (e.g., CDR information) includes: generating, at the first communications processing device, said first set of communications media fingerprints.

System Embodiment 3. The system of System Embodiment 2, wherein said generating from a first plurality of communications passing through a first communications network a first set of communications media fingerprints and corresponding communications information (e.g., CDR information) includes: associating individual communications media fingerprints in said first set of communications media fingerprints with corresponding communications information (e.g., each entry or record in the first set of communications media fingerprints and corresponding information including a communications media fingerprint and corresponding CDR information for the communication to which the communications media fingerprint corresponds where the CDR information is from a first set of communications data records).

System Embodiment 3A. The system of System Embodiment 3, wherein said first processor further controls the first communications processing device to perform the following operation: generating communications data records (e.g., CDRs) for communications passing through the first communications network, at least some of said communications data records corresponding to communications for which communications media fingerprints were generated by said first communications processing device.

System Embodiment 3B. The system of System Embodiment 3A, wherein said communications data records include signaling information for individual communications and wherein generating the first set of communications media fingerprints and corresponding communications information includes associating individual call data records with corresponding communications media fingerprints to generate entries in said first set of communications media fingerprints and corresponding communications information, each entry including a communications media fingerprint and corresponding communications information from the communication to which the entry corresponds (e.g., in first set of communications media fingerprints and corresponding communications information record 1 includes the communications media fingerprint for communications 1 and corresponding communications data record information for communications 1; record 2 includes the communications media fingerprint for communications 2 and corresponding communications data record information for communications 2; and so on)

System Embodiment 4. The system of System Embodiment 1, wherein said generating from a second plurality of communications (e.g., unsolicited communications received in a honey pot) a set of communications media fingerprints of a first type includes: (i) generating media fingerprint locales for one or more of the communications media fingerprints of the second set of communications media fingerprints, each of said generated media fingerprint locales including a set of communications media fingerprints based on media from a single communication from the second plurality of communications.

System Embodiment 4A. The system of System Embodiment 4, wherein for communications with media which is audio said generating media fingerprint locales for one or more of the communications media fingerprints of the second set of communications media fingerprints includes passing at least a first portion of an audio stream of a first communication from the second plurality of communications through different codecs as part of generating said media fingerprint locale for the first communications.

System Embodiment 4B. The system of System Embodiment 1, wherein communications media fingerprints for media which is audio is based on frequency characteristics extracted from the audio using digital signal processing.

System Embodiment 5. The system of System Embodiment 4, wherein the first processor further controls the first communications processing device to perform the following operations: comparing (e.g., before said operation of labeling) individual communications media fingerprints in said first set of communications media fingerprints and corresponding communications information to communications media fingerprints in said set of communications media fingerprints of said first type to identify communications media fingerprints in said first set of communications media fingerprints and corresponding communications information that match a communications media fingerprint (e.g., any individual one of the communications media fingerprints) in said set of communications media fingerprints of said first type.

System Embodiment 5A. The system of System Embodiment 1, wherein the first processor further controls the first communications processing device to perform the operation of: comparing (e.g., before said operation of labeling) individual communications media fingerprints in said first set of communications media fingerprints and corresponding communications information to communications media fingerprints in said set of communications media fingerprints of said first type to identify communications media fingerprints in said first set of communications media fingerprints and corresponding communications information that match a communications media fingerprint (e.g., any individual one of the communications media fingerprints) in said set of communications media fingerprints of said first type.

System Embodiment 5B. The system of System Embodiment 5A, wherein said match is an exact match or a fuzzy match.

System Embodiment 5C. The system of System Embodiment 5, wherein each of said communications which are included in said first plurality of communications is different than each of said communications which are included in said second plurality of communications (e.g., none of the communications, e.g., calls, which are included in the first plurality of communications are included in the second plurality of communications, e.g., because they are communications, e.g., calls, from non-overlapping time periods or different country regions).

System Embodiment 5D. The system of System Embodiment 5, wherein one or more of said communications which are included in said first plurality of communications is included in said second plurality of communications; wherein a first communication is included in said first plurality of communications and said second plurality of communications, said first communications being used to generate an entry in the first set of communications media fingerprints and an entry in the second set of communications media fingerprints.

System Embodiment 6. The system of System Embodiment 5, wherein said operation of labeling individual communications media fingerprints in said first set of communications media fingerprints includes labeling communications media fingerprints in said first set of communications media fingerprints and corresponding communications information as being not first type (e.g., undesired) communications media fingerprints when the individual communications media fingerprint being labeled does not match a communications media fingerprint in said set of communications media fingerprints of the first type.

System Embodiment 7. The system of System Embodiment 6, wherein said first processor controls the first communications processing device perform the following operations: selecting a balanced set of communications media fingerprints and corresponding communications information by i) selecting some labeled first type (e.g., undesired) communications media fingerprints and corresponding communications information, and ii) selecting some labeled not first type (e.g., desired) communications media fingerprints and corresponding communications information; and storing the selected balanced set of communications media fingerprints and corresponding communications information as a set of automatically generated and labeled training data including communications media fingerprints of both not first type (e.g., desired) communications and first type (e.g., undesired) communications.

System Embodiment 8. The system of System Embodiment 7, wherein said first type is undesired; wherein said not first type is desired; said method further comprising: dividing, prior to selecting the balanced set of communications media fingerprints, communications media fingerprints and corresponding communications information into a labeled set of first type (e.g., undesired) communications media fingerprints and corresponding communications information and a labeled set of not first type (e.g., desired) communications media fingerprints and corresponding communications; and wherein the labeled set of first type communications media fingerprints and corresponding communications information is a labeled set of undesired communications media fingerprints and corresponding communications information; and wherein the labeled set of not first type communications media fingerprints and corresponding communications is a labeled set of desired communications media fingerprints and correspond communications.

System Embodiment 9. The system of System Embodiment 8, wherein selecting a balanced set of communications media fingerprints and corresponding communications information includes selecting equal or near equal numbers of communications media fingerprints and corresponding communications information from the labeled set of undesired communications media fingerprints and corresponding communications information and the labeled set of desired communications media fingerprints and corresponding communications.

System Embodiment 9A. The system of System Embodiment 9, wherein the labeled set of desired communications media fingerprints and corresponding communications information includes more records (e.g., 10 times or some other multiple) than the labeled set of undesired communications media fingerprints; and wherein the balanced set of communications media fingerprints and corresponding communications information includes an equal or near equal number of records corresponding to desired communications and undesired communications.

System Embodiment 10. The system of System Embodiment 9, wherein the first processor controls the first communications processing device to: perform one or more communications model training operations using said balanced set of communications media fingerprints and corresponding communications information as a labeled set of communications training data to generate one or more models used to distinguish between desired communications and undesired communications.

System Embodiment 11. The system of System Embodiment 10, wherein said operation to perform one or more classification model training operations includes generating at least a first communications model that determines whether a communication is an undesired communication.

System Embodiment 11A. The system of System Embodiment 11, wherein said first classification model is based on non-media features (e.g., signaling related features such as source address, source identifier, calling party name, calling party number, source identifier, calling party country of origin, time of day) included in said balanced set of communications media fingerprints and corresponding communications information.

System Embodiment 11B. The system of System Embodiment 11A, wherein said first classification model is not based on features included in the media included in a communication and thus does not require the examination or use of communications media to determine whether a communication is an undesired communication.

System Embodiment 11C. The system of System Embodiment 11, wherein said operation to perform one or more classification model training operations includes generating a second classification model that determines whether a communication is a desired communication.

System Embodiment 12. The system of System Embodiment 11, wherein said first processor further controls the first communications processing device to perform the following operations: deploying the generated first classification model in a second communications network; and using the deployed model to identify undesired communications in the communications network in which the model is deployed.

System Embodiment 12A. The system of System Embodiment 12, wherein using the first classification model to identify undesired communications in the second communications network in which the model is deployed is performed in real time before the media corresponding to the communications identified as undesired communications are delivered to a communications network user (e.g., individual to whom a call or Email communication is directed).

System Embodiment 12B. The system of System Embodiment 12, wherein said first communications network and said second communications network are different communications networks.

System Embodiment 13. The system of System Embodiment 12, wherein said first processor further controls the first communications processing device to perform the following operation: blocking one or more undesired communications identified using the deployed first classification model from completing to an intended destination.

Listing of Non-Transitory Computer Readable Medium Embodiments:

Non-transitory Computer Readable Medium Embodiment 1. A non-transitory computer readable medium including a first set of computer executable instructions which when executed by a processor of a computing device cause the computing device to: generate from a first plurality of communications passing through a first communications network a first set of communications media fingerprints and corresponding communications information (e.g., CDR information), said communications media fingerprints included in said first set of communications media fingerprints and corresponding communications information being a first set of communications media fingerprints; generate from a second plurality of communications a set of communications media fingerprints of a first type, said set of communications media fingerprints of a first type being a second set of communications media fingerprints, (e.g., a set of reliably labeled undesired communications media fingerprints) each individual communication of said second plurality of communications having characteristics indicating a probability greater than a first threshold (e.g., a high probability such as 90%) that the individual communication is of said first type; label individual communications media fingerprints in said first set of communications media fingerprints and corresponding communications information, said step of labeling including labeling communications media fingerprints in said first set of communications media fingerprints and corresponding communications information as being of said first type (e.g., undesired communication) when the individual communications media fingerprint being labeled matches a communications media fingerprint in said set of communications media fingerprints of said first type.

Non-transitory Computer Readable Medium Embodiment 1A1. The non-transitory computer readable medium of Non-transitory Computer Readable Medium Embodiment 1, wherein each entry in the first set of communications media fingerprints and corresponding communications information includes a communications media fingerprint and corresponding communication information for an individual communication.

Non-transitory Computer Readable Medium Embodiment 1A2. The non-transitory computer readable medium of Non-transitory Computer Readable Medium Embodiment 1, wherein each entry in the first set of communications media fingerprints and corresponding information is stored in a record.

Non-transitory Computer Readable Medium Embodiment 1A3. The non-transitory computer readable medium of Non-transitory Computer Readable Medium Embodiment 1A1, wherein said communications information for an individual communication includes one or more of the following: communication source identifier (e.g., calling party name, calling party number), communication destination identifier (e.g., called party name, called party number), communication source IP address, communication destination IP address, communication start time, communication completion or termination time, media type (audio call, video call, audio/video call, e-mail, text message, SMS message), SIP-User-Agent content, Via header content and format, ingress trunk group, egress trunk group, geographical location information for origin of communication, geographical destination information for destination of communication, area code and/or country code of origin of communication, area code and/or country code of destination of communication, etc.

Non-transitory Computer Readable Medium Embodiment 1B. The non-transitory computer readable medium of Non-transitory Computer Readable Medium Embodiment 1, wherein said first plurality of communications are telephone calls; wherein said second plurality of communications are telephone calls; wherein said first type is an undesired communication (e.g., a robocall); and wherein said characteristics indicating a probability greater than a first threshold that the individual communication is of said first type include: (i) the communication is a telephone call, and (ii) that the communication is directed to an unused destination telephone number.

Non-transitory Computer Readable Medium Embodiment 1C. The non-transitory computer readable medium of Non-transitory Computer Readable Medium Embodiment 1, wherein said first set of computer executable instructions which when executed by the processor of a computing device further cause the computing device to: operate a communications capture system (e.g., honeypot) that captures communications having characteristics indicating a probability greater than a first threshold (e.g., a high probability such as 90%) that the individual communication is of said first type.

Non-transitory Computer Readable Medium Embodiment 2. The non-transitory computer readable medium of Non-transitory Computer Readable Medium Embodiment 1, wherein said generating from a first plurality of communications passing through a first communications network a first set of communications media fingerprints and corresponding communications information (e.g., CDR information) includes: generating, at a first fingerprinting device, said first set of communications media fingerprints.

The techniques of various embodiments may be implemented using software, hardware and/or a combination of software and hardware. Various embodiments are directed to apparatus, e.g., fingering printing devices, communications processing devices, call processing devices, session border controllers, suspect robocall detector, classifiers, aggregators, model generators, telecommunications systems, network nodes and/or network equipment devices. Various embodiments are also directed to methods, e.g., method of controlling and/or operating devices such as call processing devices, session border controllers, suspect robocall detector, classifiers, aggregators, aggregator & feature extractors, parser & aggregator, model parameterization, real-time communications entities, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., call processing device, session border controller, suspect robocall detector, classifier, aggregator, aggregator & feature extractor, parser & aggregator, model parameterization device, including a processor configured to implement one, multiple or all of the steps of one or more methods of the invention.

In some embodiments, the processor or processors, e.g., CPUs, of one or more devices, e.g., communications nodes such as call processing devices, session border controllers, robocall detectors are configured to perform the steps of the methods described as being performed by the communications nodes, e.g., session border controller, robocall detector, classifier, aggregator, aggregator & feature extractor, parser & aggregator, model parameterization device. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a call processing device, a signaling session border controller or robocall detector with a processor which includes a component corresponding to each of the steps of the various described methods performed by the device in which the processor is included. In some but not all embodiments a device, e.g., communications node such as a call processing device or session border controller, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of processing communications comprising:
generating, by a first network equipment device, from a first plurality of communications passing through a first communications network, a first set of communications media fingerprints and corresponding communications information, said communications media fingerprints, included in said first set of communications media fingerprints and corresponding communications information, being a first set of communications media fingerprints;
generating, by a second network equipment device, from a second plurality of communications, a set of communications media fingerprints of a first type, said set of communications media fingerprints of a first type being a second set of communications media fingerprints, each individual communication of said second plurality of communications having characteristics indicating a probability greater than a first threshold that the individual communication is of said first type;
labeling, by a training dataset generator, individual communications media fingerprints, in said first set of communications media fingerprints and corresponding communications information, said step of labeling including labeling communications media fingerprints, in said first set of communications media fingerprints and corresponding communications information, as being of said first type when the individual communications media fingerprint being labeled matches a communications media fingerprint in said set of communications media fingerprints of said first type; and
training, by a model generator, a model to identify communications of the first type, said training including using one or more labeled communications media fingerprints and corresponding communications information, from the first set of communications media fingerprints and corresponding communications information, to train the model to identify communications of the first type.

2. The method of claim 1,
wherein said first plurality of communications are telephone calls;
wherein said second plurality of communications are telephone calls;
wherein said first type is an undesired communication; and
wherein said characteristics indicating a probability greater than a first threshold that the individual communication is of said first type include: (i) the communication is a telephone call, and (ii) that the communication is directed to an unused destination telephone number.

3. The method of claim 1, wherein said generating from a first plurality of communications passing through a first communications network a first set of communications media fingerprints and corresponding communications information includes: generating, at a first fingerprinting device of the first network equipment device, said first set of communications media fingerprints.

4. The method of claim 3, wherein said generating from a first plurality of communications passing through a first communications network a first set of communications media fingerprints and corresponding communications information includes: associating individual communications media fingerprints in said first set of communications media fingerprints with corresponding communications information.

5. The method of claim 1, wherein said generating from a second plurality of communications a set of communications media fingerprints of a first type includes: (i) generating media fingerprint locales for one or more of the communications media fingerprints of the second set of communications media fingerprints, each of said generated media fingerprint locales including a set of communications media fingerprints based on media from a single communication from the second plurality of communications.

6. The method of claim 5, further comprising:
comparing individual communications media fingerprints in said first set of communications media fingerprints and corresponding communications information to communications media fingerprints in said set of communications media fingerprints of said first type to identify communications media fingerprints in said first set of communications media fingerprints and corresponding communications information that match a communications media fingerprint in said set of communications media fingerprints of said first type.

7. The method of claim 6, wherein said step of labeling individual communications media fingerprints, in said first set of communications media fingerprints and corresponding communications information. includes labeling communications media fingerprints in said first set of communications media fingerprints and corresponding communications information as being not first type communications media fingerprints when the individual communications media fingerprint being labeled does not match a communications media fingerprint in said set of communications media fingerprints of the first type.

8. The method of claim 7, further comprising:

selecting a balanced set of communications media fingerprints and corresponding communications information by: i) selecting some labeled first type communications media fingerprints and corresponding communications information, and ii) selecting some labeled not first type communications media fingerprints and corresponding communications information; and storing the selected balanced set of communications media fingerprints and corresponding communications information as a set of automatically generated and labeled training data including communications media fingerprints of both not first type communications and first type communications.

9. The method of claim 8, wherein said first type is undesired;

wherein said not first type is desired;

said method further comprising:

dividing, prior to selecting the balanced set of communications media fingerprints and corresponding communications information, communications media fingerprints and corresponding communications information into a labeled set of first type communications media fingerprints and corresponding communications information and a labeled set of not first type communications media fingerprints and corresponding communications; and wherein the labeled set of first type communications media fingerprints and corresponding communications information is a labeled set of undesired communications media fingerprints and corresponding communications information; and wherein the labeled set of not first type communications media fingerprints and corresponding communications is a labeled set of desired communications media fingerprints and corresponding communications.

10. The method of claim 9, wherein selecting a balanced set of communications media fingerprints and corresponding communications information includes selecting equal or near equal numbers of communications media fingerprints and corresponding communications information from the labeled set of undesired communications media fingerprints and corresponding communications information and the labeled set of desired communications media fingerprints and corresponding communications.

11. The method of claim 10, further comprising:

performing one or more classification model training operations using said balanced set of communications media fingerprints and corresponding communications information as a labeled set of communications training data to generate one or more models used to distinguish between desired communications and undesired communications.

12. The method of claim 11, wherein said step of performing one or more classification model training operations includes generating at least a first classification model that determines whether a communication is an undesired communication.

13. A system of processing communications comprising:

a first communications processing device, said first communications processing device including:

a first memory; and a first processor, said first processor controlling the first communications processing device to perform the following operations:

generating, from a first plurality of communications passing through a first communications network, a first set of communications media fingerprints and corresponding communications information, said communications media fingerprints, included in said first set of communications media fingerprints and corresponding communications information, being a first set of communications media fingerprints;

generating, from a second plurality of communications, a set of communications media fingerprints of a first type, said set of communications media fingerprints of a first type being a second set of communications media fingerprints, each individual communication of said second plurality of communications having characteristics indicating a probability greater than a first threshold that the individual communication is of said first type; and labeling individual communications media fingerprints, in said first set of communications media fingerprints and corresponding communications information, said step of labeling including labeling communications media fingerprints, in said first set of communications media fingerprints and corresponding communications information, as being of said first type when the individual communications media fingerprint being labeled matches a communications media fingerprint in said set of communications media fingerprints of said first type.

14. The system of claim 13, wherein said generating, from a first plurality of communications passing through a first communications network, a first set of communications media fingerprints and corresponding communications information includes: generating, at the first communications processing device, said first set of communications media fingerprints.

15. The system of claim 14, wherein said generating, from a first plurality of communications passing through a first communications network, a first set of communications media fingerprints and corresponding communications information includes: associating individual communications media fingerprints in said first set of communications media fingerprints with corresponding communications information.

16. The system of claim 13, wherein said generating from a second plurality of communications a set of communications media fingerprints of a first type includes: (i) generating media fingerprint locales for one or more of the communications media fingerprints of the second set of communications media fingerprints, each of said generated media fingerprint locales including a set of communications media fingerprints based on media from a single communication from the second plurality of communications.

17. The system of claim 16, wherein the first processor further controls the first communications processing device to perform the following operation:

comparing individual communications media fingerprints, in said first set of communications media fingerprints and corresponding communications information, to communications media fingerprints in said set of communications media fingerprints of said first type to identify communications media fingerprints, in said first set of communications media fingerprints and corresponding communications information, that match a communications media fingerprint in said set of communications media fingerprints of said first type.

18. The system of claim 17, wherein said operation of labeling individual communications media fingerprints, in said first set of communications media fingerprints and corresponding communications information. includes labeling communications media fingerprints in said first set of communications media fingerprints and corresponding communications information, as being not first type communications media fingerprints when the individual communications media fingerprint being labeled does not match a communications media fingerprint in said set of communications media fingerprints of the first type.

19. The system of claim 18, wherein said first processor controls the first communications processing device to perform the following operations:
selecting a balanced set of communications media fingerprints and corresponding communications information by: i) selecting some labeled first type communications media fingerprints and corresponding communications information, and ii) selecting some labeled not first type communications media fingerprints and corresponding communications information; and
storing the selected balanced set of communications media fingerprints and corresponding communications information as a set of automatically generated and labeled training data including communications media fingerprints of both not first type communications and first type communications.

20. A non-transitory computer readable medium including a first set of computer executable instructions which when executed by a processor of a computing device cause the computing device to:
generate, from a first plurality of communications passing through a first communications network, a first set of communications media fingerprints and corresponding communications information, said communications media fingerprints, included in said first set of communications media fingerprints and corresponding communications information, being a first set of communications media fingerprints;
generate, from a second plurality of communications, a set of communications media fingerprints of a first type, said set of communications media fingerprints of a first type being a second set of communications media fingerprints, each individual communication of said second plurality of communications having characteristics indicating a probability greater than a first threshold that the individual communication is of said first type; and
label individual communications media fingerprints, in said first set of communications media fingerprints and corresponding communications information, said step of labeling including labeling communications media fingerprints, in said first set of communications media fingerprints and corresponding communications information, as being of said first type when the individual communications media fingerprint being labeled matches a communications media fingerprint in said set of communications media fingerprints of said first type.

21. The method of claim 1, further comprising:
deploying the trained model to a communications processing device or node;
receiving a first communication at the communication processing device or node;
identifying by the trained model that the first communication is of the first type;
performing a first action, by the communications processing device or node, on the first communication; and
wherein said first type is an undesired communication.

22. The method of claim 21, wherein said first action is to block the first communication from completing to an intended destination.

23. The method of claim 1,
wherein the first network equipment device is a first Session Border Controller; and
wherein the second network equipment device is a second Session Border Controller or the training dataset generator.

24. The method of claim 1,
wherein one or more of the following are implemented on one or more compute nodes in a cloud: the first network equipment device, the second network equipment device, the training dataset generator, and the model generator.

25. The method of claim 1,
wherein the model to identify communications of the first type is not based on features included in media of a communication.

* * * * *